US012615365B2

(12) United States Patent
Ray et al.

(10) Patent No.: US 12,615,365 B2
(45) Date of Patent: Apr. 28, 2026

(54) INTRA-MODE DEPENDENT MULTIPLE TRANSFORM SELECTION FOR VIDEO CODING

(71) Applicant: QUALCOMM Incorporated, San Diego, CA (US)

(72) Inventors: Bappaditya Ray, San Diego, CA (US); Muhammed Zeyd Coban, Carlsbad, CA (US); Louis Joseph Kerofsky, San Diego, CA (US); Vadim Seregin, San Diego, CA (US); Marta Karczewicz, San Diego, CA (US); Keming Cao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 526 days.

(21) Appl. No.: 17/658,803

(22) Filed: Apr. 11, 2022

(65) Prior Publication Data

US 2022/0329800 A1 Oct. 13, 2022

Related U.S. Application Data

(60) Provisional application No. 63/223,377, filed on Jul. 19, 2021, provisional application No. 63/173,884, filed on Apr. 12, 2021.

(51) Int. Cl.
| | |
|---|---|
| *H04N 19/12* | (2014.01) |
| *H04N 19/159* | (2014.01) |
| (Continued) | |

(52) U.S. Cl.
CPC ........... *H04N 19/12* (2014.11); *H04N 19/159* (2014.11); *H04N 19/176* (2014.11); *H04N 19/46* (2014.11)

(58) Field of Classification Search
None
See application file for complete search history.

(56) References Cited

U.S. PATENT DOCUMENTS

| | | |
|---|---|---|
| 2018/0020218 A1 | 1/2018 | Zhao et al. |
| 2019/0215521 A1* | 7/2019 | Chuang ................ H04N 19/105 |
| (Continued) | | |

FOREIGN PATENT DOCUMENTS

| | | |
|---|---|---|
| JP | 2022532114 A | 7/2022 |
| WO | 2020226424 A1 | 11/2020 |
| WO | 2020242183 A1 | 12/2020 |

OTHER PUBLICATIONS

Abdoli M., et al., "Non-CE3: Decoder-Side Intra Mode Derivation with Prediction Fusion Using Planar", JVET-00449-v2, Joint Video Experts Team (JVET) of ITU-T SG 16 WP 3 and ISO/IEC JTC 1/SC 29/WG 11, 15th Meeting: Gothenburg, SE, Jul. 3-12, 2019, pp. 1-9.
(Continued)

*Primary Examiner* — Mohammed Jebari
(74) *Attorney, Agent, or Firm* — Shumaker & Sieffert, P. A.

(57) ABSTRACT

An example device for decoding video data includes a memory configured to store video data; and one or more processors implemented in circuitry and configured to: determine a size of a current block of video data; determine an intra-prediction mode for the current block of video data; determine a mode group including the determined intra-prediction mode, the mode group being one of a plurality of mode groups, each including respective sets of intra-prediction modes; determine a set of available multiple transform selection (MTS) schemes for the current block according to the size and the intra-prediction mode for the current block; determine an MTS scheme from the set of available MTS schemes according to the determined mode group; apply transforms of the MTS scheme to a transform block of the
(Continued)

current block to produce a residual block for the current block; and decode the current block using the residual block.

18 Claims, 13 Drawing Sheets

(51) Int. Cl.
*H04N 19/176* (2014.01)
*H04N 19/46* (2014.01)

(56) References Cited

U.S. PATENT DOCUMENTS

| | | | | |
|---|---|---|---|---|
| 2021/0211729 A1* | 7/2021 | Koo | ..................... | H04N 19/12 |
| 2021/0235119 A1* | 7/2021 | Kim | ..................... | H04N 19/157 |
| 2022/0038740 A1* | 2/2022 | Zhao | ..................... | H04N 19/593 |
| 2022/0060700 A1* | 2/2022 | Kang | ..................... | H04N 19/593 |
| 2022/0060751 A1 | 2/2022 | Nam et al. | | |
| 2022/0150504 A1* | 5/2022 | Koo | ..................... | H04N 19/18 |
| 2022/0224922 A1* | 7/2022 | Wang | ..................... | H04N 19/147 |
| 2022/0264151 A1* | 8/2022 | Lim | ..................... | H04N 19/61 |
| 2022/0329862 A1* | 10/2022 | Huo | ..................... | H04N 19/593 |
| 2022/0360785 A1* | 11/2022 | Huo | ..................... | H04N 19/105 |
| 2022/0385906 A1 | 12/2022 | Zhao et al. | | |
| 2023/0024223 A1* | 1/2023 | Le Leannec | ......... | H04N 19/132 |
| 2023/0328287 A1* | 10/2023 | Pfaff | ..................... | H04N 19/619 |
| | | | | 375/240.18 |
| 2024/0205392 A1* | 6/2024 | Wang | ..................... | H04N 19/11 |

OTHER PUBLICATIONS

Bross B., et al., "Versatile Video Coding (Draft 10)", Joint Video Experts Team (JVET) of ITU-T SG 16 WP 3 and ISO/IEC JTC 1/SC 29/WG 11, 131, MPEG Meeting, 19th Meeting, by Teleconference, Jun. 22-Jul. 1, 2020, Jun. 29, 2020-Jul. 3, 2020, Online, (Motion Picture Expert Group or ISO/IEC JTC1/SC29/WG11), No. JVET-S2001-vH, Sep. 4, 2020 (Sep. 4, 2020), XP030293002, 551 Pages, Retrieved from the Internet: URL: https://dms.mpeg.expert/doc_eng_user/documents/131_Teleconference/wg11/mS4716-JVET-S2001-v17-JVET-S2001-vH.zip.
Cao K., et al., "EE2-Related: Fusion for Template-Based Intra Mode Derivation", JVET-W0123-V2, Joint Video Experts Team (JVET) of ITU-T SG 16 WP 3 and ISO/IEC JTC 1/SC 29, 23rd Meeting, by teleconference, Jul. 7-16, 2021, pp. 1-4.
Chang Y-J., et al., "Compression Efficiency Methods Beyond VVC", 21. JVET Meeting, Joint Video Experts Team (JVET) of ITU-T SG 16 WP 3 and ISO/IEC JTC 1/SC 29, JVET-U0100, 133. MPEG Meeting, 21st Meeting, by teleconference, Jan. 6-15, 2021, (The Joint Video Exploration Team of ISO/IEC JTC1/SC29/WG11 and ITU-T SG. 16), No. JVET-U0100, Dec. 31, 2020 (Dec. 31, 2020), XP030293237, Jan. 11, 2021-Jan. 15, 2021, Online, (Motion Picture Expert Group or ISO/IEC JTC1/SC29/WG11), No. m55890, XP030290689, pp. 1-13.
Chen J., et al., "Algorithm Description for Versatile Video Coding and Test Model 10 (VTM 10)", JVET-S2002-v2, Joint Video Experts Team (JVET) of ITU-T SG 16 WP 3 and ISO/IEC JTC 1/SC 29/WG 11, 131. MPEG Meeting, 19th Meeting: by teleconference, Jun. 22-Jul. 1, 2020, Jun. 29, 2020-Jul. 3, 2020, Online, (Motion Picture Expert Group or ISO/IEC JTC1/SC29/WG11), No. m54825, Aug. 12, 2020 (Aug. 12, 2020), XP030293004, pp. 1-99, Retrieved from the Internet: URL: https://dms.mpeg.expert/doc_end_user/documents/131_Teleconference/wg11/m54825-JVET-S2002-v1.
ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.
ITU-T H.266: "Series H: Audiovisual and Multimedia Systems Infrastructure of Audiovisual Services—Coding of Moving Video", Versatile Video Coding, The International Telecommunication Union, Aug. 2020, 516 pages.
Karczewicz M., et al., "Common Test Conditions and Evaluation Procedures for Enhanced Compression Tool Testing", JVET-V2017-v1, Joint Video Experts Team (JVET) of ITU-T SG 16 WP 3 and ISO/IEC JTC 1/SC 29, 22nd Meeting, by teleconference, Apr. 20-28, 2021, pp. 1-7.
Ray B., et al., "EE2: Enhanced Intra MTS and LFNST (Tests 4.1, 4.2, and 4.4)", JVET-W0103-v4, Joint Video Experts Team (JVET) of ITU-T SG 16 WP 3 and ISO/IEC JTC 1/SC 29, 23rd Meeting, by teleconference, Jul. 7-16, 2021, JVET-W0103-v3 doc, pp. 1-4.
Ray B., et al., "Enhanced Intra MTS and LFNST for Compression Beyond VVC", JVET-V0116-v3, Joint Video Experts Team (JVET) of ITU-T SG 16 WP 3 and ISO/IEC JTC 1/SC 29, 22nd Meeting, by teleconference, Apr. 20-28, 2021, pp. 1-10.
Said A., et al., "CE6.1.1: Extended AMT", JVET-K0375-v2, Joint Video Experts Team (JVET) of ITU-T SG 16 WP 3 and ISO/IEC JTC 1/SC 29/WG 11, 11th Meeting: Ljubljana, SI, Jul. 10-18, 2018, pp. 1-11.
Seregin V., et al., "Exploration Experiment on Enhanced Compression Beyond VVC capability (EE2)", JVET-V2024-v3, Joint Video Experts Team (JVET) of ITU-T SG 16 WP 3 and ISO/IEC JTC 1/SC 29, 22nd Meeting, by teleconference, Apr. 20-28, 2021, pp. 1-7.
Seregin V., et al., "Exploration Experiment on Enhanced Compression Beyond VVC Capability", JVET-U2024-v2, Joint Video Experts Team (JVET) of ITU-T SG 16 WP 3 and ISO/IEC JTC 1/SC 29, 21st Meeting, by teleconference, Jan. 6-15, 2021, pp. 1-19.
Wang Y., et al., "EE2-Related: Template-Based Intra Mode Derivation Using MPMs", JVET-V0098, Joint Video Experts Team (JVET) of ITU-T SG 16 WP 3 and ISO/IEC JTC 1/SC 29, 22nd Meeting, by teleconference, Apr. 20-28, 2021, pp. 1-4.
Zhao X., et al., "Six Tap Intra Interpolation Filter," JVET Meeting, (The Joint Video Exploration Team (JVET) of ITU-T SG 16 WP 3 and ISO/IEC JTC 1/SC 29/WG 11), 4th Meeting, Chengdu, CN, Oct. 15-21, 2016, No. JVET-D0119r1, pp. 1-3.
Chen J., et al., "Algorithm Description for Versatile Video Coding and Test Model 11 (VTM 11)", JVET-T2002-v2, Joint Video Experts Team (JVET) of ITU-T SG 16 WP 3 and ISO/IEC JTC 1/SC 29, 20th Meeting, by teleconference, Oct. 7-16, 2020, pp. 1-101.
International Search Report and Written Opinion—PCT/US2022/071669—ISA/EPO—Aug. 10, 2022, 17 Pages.
Abdoli M., et al., "Non-CE3: Decoder-side Intra Mode Derivation with Prediction Fusion Using Planar", JVET-O0449-v2, Joint Video Experts Team (JVET) of ITU-T SG 16 WP 3 and ISO/IEC JTC 1/SC 29/WG 1115th Meeting: Gothenburg, XP030219611, Jul. 4, 2019, SE, Jul. 3-12, 2019, pp. 1-9.

* cited by examiner

0: Planar
1: DC

FIG. 3

RECEIVE ENTROPY CODED
DATA FOR CURRENT BLOCK ⟋370

ENTROPY DECODE DATA TO
DETERMINE PREDICTION AND
REPRODUCE COEFFICIENTS ⟋372

PREDICT CURRENT BLOCK ⟋374

INVERSE SCAN REPRODUCED
COEFFICIENTS ⟋376

INVERSE QUANTIZE AND
INVERSE TRANSFORM
COEFFICIENTS TO PRODUCE
RESIDUAL BLOCK ⟋378

COMBINE PREDICTED BLOCK
AND RESIDUAL BLOCK ⟋380

INTRA-MODE DEPENDENT MULTIPLE TRANSFORM SELECTION FOR VIDEO CODING

This application claims the benefit of U.S. Provisional Application No. 63/173,884, filed Apr. 12, 2021, and of U.S. Provisional Application No. 63/223,377, filed Jul. 19, 2021, the entire contents of each of which are hereby incorporated by reference.

TECHNICAL FIELD

This disclosure relates to video coding, including video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), ITU-T H.266/Versatile Video Coding (VVC), and extensions of such standards, as well as proprietary video codecs/formats such as AOMedia Video 1 (AV1) developed by the Alliance for Open Media. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for selecting a multiple transform selection (MTS) scheme for video coding. A video coder may partition a picture into blocks and code each block individually. Coding generally includes forming a prediction block according to a prediction mode and coding a residual block, where the residual block represents differences between the prediction block and the actual block. A video encoder may apply a transform to the residual block, whereas a video decoder may apply an inverse transform to a transform block to reproduce the residual block. An MTS scheme includes multiple transforms that are applied during residual block coding, including a horizontal transform and a vertical transform. According to the techniques of this disclosure, a video coder may be configured to select an MTS scheme according to a size of a block and an intra-prediction mode for the block.

In some examples, the video coder may determine the MTS scheme according to a size group including the size of the block. For example, the size group may be a range of block sizes. The video coder may be configured with a variety of different size groups, each corresponding to different MTS schemes. Additionally or alternatively, in some examples, the video coder may determine the MTS scheme according to a mode group including the intra-prediction mode for the current block. For example, the mode group may be a set of intra-prediction modes. The video coder may be configured with a variety of different mode groups, each corresponding to different MTS schemes. In some examples, the video coder may apply size symmetry to select the MTS scheme. For example, a size of M×N, where M and N are non-equal integer values, and predicted using a directional intra-prediction mode, may be mapped to an MTS scheme, and the video coder may be configured to select the same MTS scheme for an N×M block predicted using a symmetric directional intra-prediction mode.

In one example, a method of decoding video data includes: determining a size of a current block of video data; determining an intra-prediction mode for the current block of video data; determining a mode group including the determined intra-prediction mode, the mode group being one of a plurality of mode groups, each of the mode groups in the plurality of mode groups including respective sets of intra-prediction modes such that each possible intra-prediction mode is included in no more than one of the mode groups; determining a set of available multiple transform selection (MTS) schemes for the current block according to the size and the intra-prediction mode for the current block, the set of available MTS schemes being one set of available MTS schemes of a plurality of sets of MTS schemes; determining an MTS scheme from the set of available MTS schemes according to the determined mode group; applying transforms of the MTS scheme to a transform block of the current block to produce a residual block for the current block; and decoding the current block using the residual block.

In another example, a device for decoding (and potentially also encoding) video data may include a memory configured to store video data; and one or more processors implemented in circuitry and configured to: determine a size of a current block of video data; determine an intra-prediction mode for the current block of video data; determine a mode group including the determined intra-prediction mode, the mode group being one of a plurality of mode groups, each of the mode groups in the plurality of mode groups including respective sets of intra-prediction modes such that each possible intra-prediction mode is included in no more than one of the mode groups; determine a set of available multiple transform selection (MTS) schemes for the current block according to the size and the intra-prediction mode for the current block, the set of available MTS schemes being one set of available MTS schemes of a plurality of sets of MTS schemes; determine an MTS scheme from the set of available MTS schemes according to the determined mode group; apply transforms of the MTS scheme to a transform block of the current block to produce a residual block for the current block; and decode the current block using the residual block.

In another example, a computer-readable storage medium has stored thereon instructions that, when executed, cause a processor of a device for decoding video data to: determine a size of a current block of video data; determine an intra-prediction mode for the current block of video data; determine a mode group including the determined intra-prediction mode, the mode group being one of a plurality of mode groups, each of the mode groups in the plurality of mode groups including respective sets of intra-prediction modes such that each possible intra-prediction mode is included in no more than one of the mode groups; determine a set of available multiple transform selection (MTS) schemes for the current block according to the size and the intra-prediction mode for the current block, the set of available MTS schemes being one set of available MTS schemes of a plurality of sets of MTS schemes; determine an MTS scheme from the set of available MTS schemes according to the determined mode group; apply transforms of the MTS scheme to a transform block of the current block to produce a residual block for the current block; and decode the current block using the residual block.

In another example, a device for decoding (and potentially also encoding) video data includes means for determining a size of a current block of video data; means for determining an intra-prediction mode for the current block of video data; means for determining a mode group including the determined intra-prediction mode, the mode group being one of a plurality of mode groups, each of the mode groups in the plurality of mode groups including respective sets of intra-prediction modes such that each possible intra-prediction mode is included in no more than one of the mode groups; means for determining a set of available multiple transform selection (MTS) schemes for the current block according to the size and the intra-prediction mode for the current block, the set of available MTS schemes being one set of available MTS schemes of a plurality of sets of MTS schemes; means for determining an MTS scheme from the set of available MTS schemes according to the determined mode group; means for applying transforms of the MTS scheme to a transform block of the current block to produce a residual block for the current block; and means for decoding the current block using the residual block.

The details of one or more examples are set forth in the accompanying drawings and the description below. Other features, objects, and advantages will be apparent from the description, drawings, and claims.

BRIEF DESCRIPTION OF DRAWINGS

FIG. 3 is a flow diagram illustrating an example of a matrix intra-prediction (MIP) process.

DETAILED DESCRIPTION

Video coding standards include ITU-T H.261, ISO/IEC MPEG-1 Visual, ITU-T H.262 or ISO/IEC MPEG-2 Visual, ITU-T H.263, ISO/IEC MPEG-4 Visual (MPEG-4 Part 2), ITU-T H.264 (also known as ISO/IEC MPEG-4 AVC), including its Scalable Video Coding (SVC) and Multiview Video Coding (MVC) extensions and ITU-T H.265 (also known as ISO/IEC MPEG-4 HEVC (High Efficiency Video Coding)) with its extensions. During the April 2018 meeting of the Joint Video Experts Team (JVET), the Versatile Video Coding (VVC) standardization activity (also known as ITU-T H.266) began, with evaluation of video compression technologies submitted in response to a Call for Proposals.

In general, this disclosure describes techniques for selecting a multiple transform selection (MTS) scheme for video coding. A video coder may partition a picture into blocks and code each block individually. Coding generally includes forming a prediction block according to a prediction mode and coding a residual block, where the residual block represents differences between the prediction block and the actual block. A video encoder may apply a transform to the residual block, whereas a video decoder may apply an inverse transform to a transform block to reproduce the residual block. An MTS scheme includes multiple transforms that are applied during residual block coding, including a horizontal transform and a vertical transform. According to the techniques of this disclosure, a video coder may be configured to select an MTS scheme according to a size of a block and an intra-prediction mode for the block.

Said et al., "CE6.1.1: Extended AMT," Joint Video Experts Team (WET) of ITU-T SG 16 WP 3 and ISO/IEC JTC 1/SC 29/WG 11, 11th Meeting: Ljubljana, SI, 10-18 Jul. 2018, Document No. JVET-K0375-v2 (hereinafter, "WET-K0375"), describes an example process for determining an MTS scheme using only the shortest side of a non-square block. As a result, for example, a 16×4 block and a 4×4 block would be treated the same for MTS determination purposes. However, statistically, the respective residual characteristics for these blocks may be different, even if they use the same intra-prediction mode. Additionally, matrix intra-prediction (MIP) modes may have different residual characteristics compared to directional intra-prediction modes. However, JVET-K0375 does not specify different transform sets for MIP modes. This disclosure describes various techniques for selecting MTS schemes that may take advantage of residual characteristics for blocks of various sizes accounting for both horizontal and vertical directions in the block size, and also accounting for MIP mode as a possible intra-prediction mode. Thus, these techniques may improve video compression without negatively impacting video quality.

Figure 1:
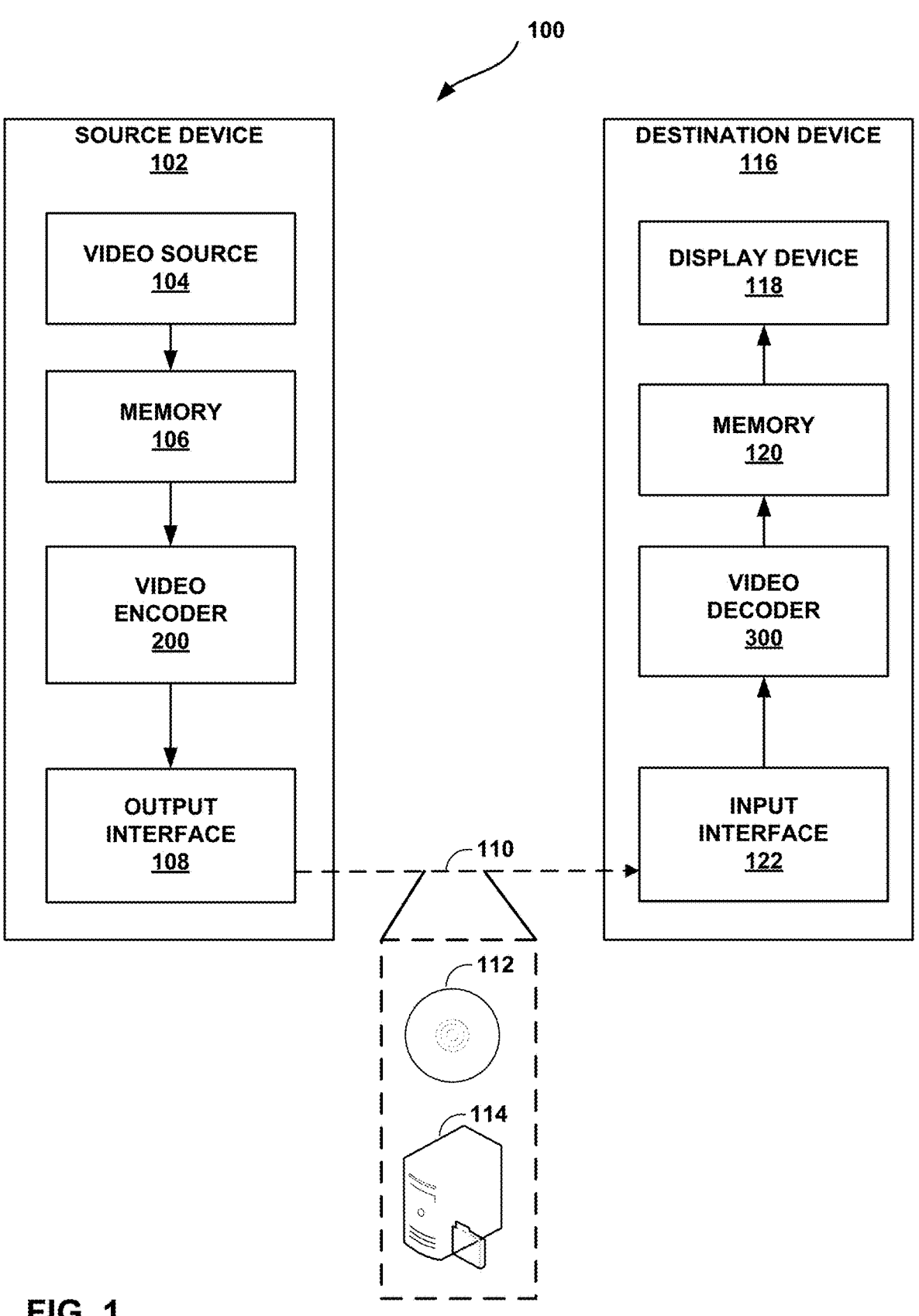
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, uncoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for determining a multiple transform selection (MTS) scheme according to a size of and an intra-prediction mode for a current block. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for determining a multiple transform selection (MTS) scheme according to a size of and an intra-prediction mode for a current block. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, uncoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or nonvolatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream.

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). In other examples, video encoder 200 and video decoder 300 may operate according to a proprietary video codec/format, such as AOMedia Video 1 (AV1), extensions of AV1, and/or successor versions of AV1 (e.g., AV2). In other examples, video encoder 200 and video decoder 300 may operate according to other proprietary formats or industry standards. The techniques of this disclosure, however, are not limited to any particular coding standard or format. In general, video encoder 200 and video decoder 300 may be configured to perform the techniques of this disclosure in conjunction with any video coding techniques that use determining a multiple transform selection (MTS) scheme according to a size of and an intra-prediction mode for a current block.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

When operating according to the AV1 codec, video encoder 200 and video decoder 300 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Video encoder 200 may further partition a superblock into smaller coding blocks. Video encoder 200 may partition a superblock and other coding blocks into smaller blocks using square or non-square partitioning. Non-square blocks may include N/2×N, N×N/2, N/4×N, and N×N/4 blocks. Video encoder 200 and video decoder 300 may perform separate prediction and transform processes on each of the coding blocks.

AV1 also defines a tile of video data. A tile is a rectangular array of superblocks that may be coded independently of other tiles. That is, video encoder 200 and video decoder 300 may encode and decode, respectively, coding blocks within a tile without using video data from other tiles. However, video encoder 200 and video decoder 300 may perform filtering across tile boundaries. Tiles may be uniform or non-uniform in size. Tile-based coding may enable parallel processing and/or multi-threading for encoder and decoder implementations.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning, QTBT partitioning, MTT partitioning, superblock partitioning, or other partitioning structures.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component may be an array or single sample from one of the three arrays (luma and two chroma) for a picture in 4:2:0, 4:2:2, or 4:4:4 color format, or an array or a single sample of the array for a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, video encoder 200 and video decoder 300 do not use video data from other frames of video data. For most intra prediction modes, video encoder 200 encodes blocks of a current frame based on the difference between sample values in the current block and predicted values generated from reference samples in the same frame. Video encoder 200 determines predicted values generated from the reference samples based on the intra prediction mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. In some examples, video encoder 200 and video decoder 300 may be configured to perform a multiple transform selection (MTS) scheme, which may include applying both a horizontal transform and a vertical transform to a block. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an rn-bit value during quantization, where n is greater than rn. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

As noted above, video encoder 200 and video decoder 300 may be configured to apply an MTS scheme to a current block. For example, video encoder 200 may apply an MTS scheme (including a horizontal transform and a vertical transform) to a residual block, whereas video decoder 300 may apply the MTS scheme to a transform block to reconstruct the residual block. According to the techniques of this disclosure, the MTS scheme may correspond to one of a set of available MTS schemes, where video encoder 200 and video decoder 300 may select the set of available MTS schemes from a plurality of sets of MTS schemes according to a size of the current block and an intra-prediction mode for the current block.

Figure 2:
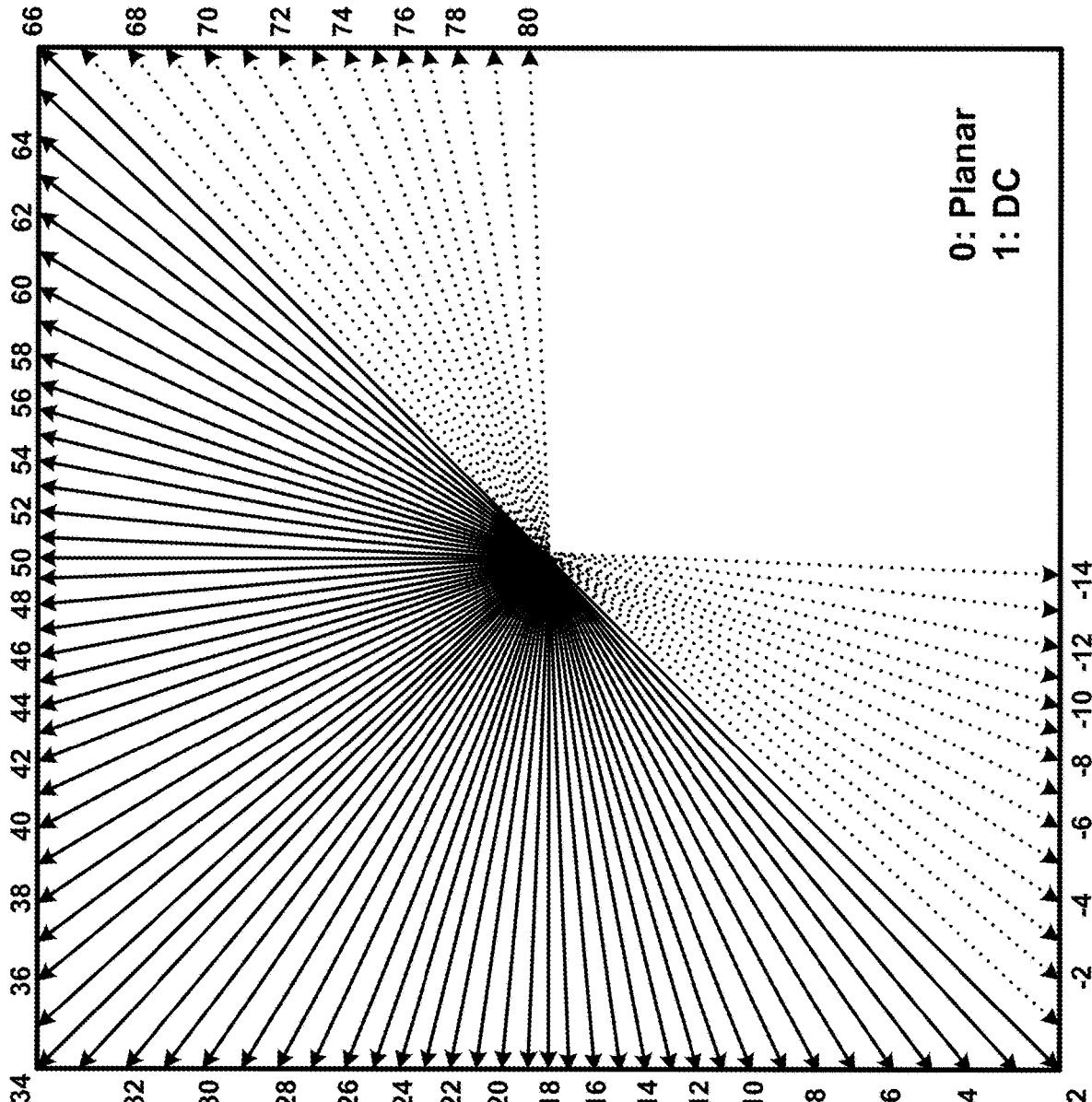
FIG. 2 is a conceptual diagram illustrating regular and wide-angle intra-prediction modes.

FIG. 2 is a conceptual diagram illustrating regular and wide-angle intra-prediction modes. To capture the arbitrary edge directions presented in natural video, the number of directional intra modes in VTM5 is extended from 33, as used in HEVC, to 65. The new directional modes in VVC are depicted in FIG. 2, and the planar and DC modes remain the same as in HEVC. These denser directional intra prediction modes apply for all block sizes and for both luma and chroma intra predictions in VVC.

Conventional (or "regular") angular intra prediction directions are defined in HEVC from 45 degrees to −135 degrees in clockwise direction, which corresponds to mode 2 to mode 66 in FIG. 2. To provide better prediction for non-square blocks, in VVC, the angles beyond 45 to −135 degrees are considered, which are shown in the FIG. 2 for modes [67, 80], and modes [−1, −14]. These modes may be referred to as "wide-angle" modes. For blocks with width (W) greater than height (H), modes [67, 80] are considered, and for blocks with width (W) less than height (H) modes [−1, −14] are considered. These directional intra prediction modes can be either used in combination with multiple reference lines (MRL), or with an intra-sub partition mode (ISP). The details can be found in J. Chen, Y. Ye, S. Kim, "Algorithm description for Versatile Video Coding and Test Model 10 (VTM10)," 19th JVET Meeting, Teleconference, July 2020, JVET-S2002 and B. Bross, J. Chen, S. Liu, "Versatile Video Coding (Draft 10)," 19$^{th}$ JVET Meeting, Teleconference, July 2020, JVET-S2001.

Figure 3:
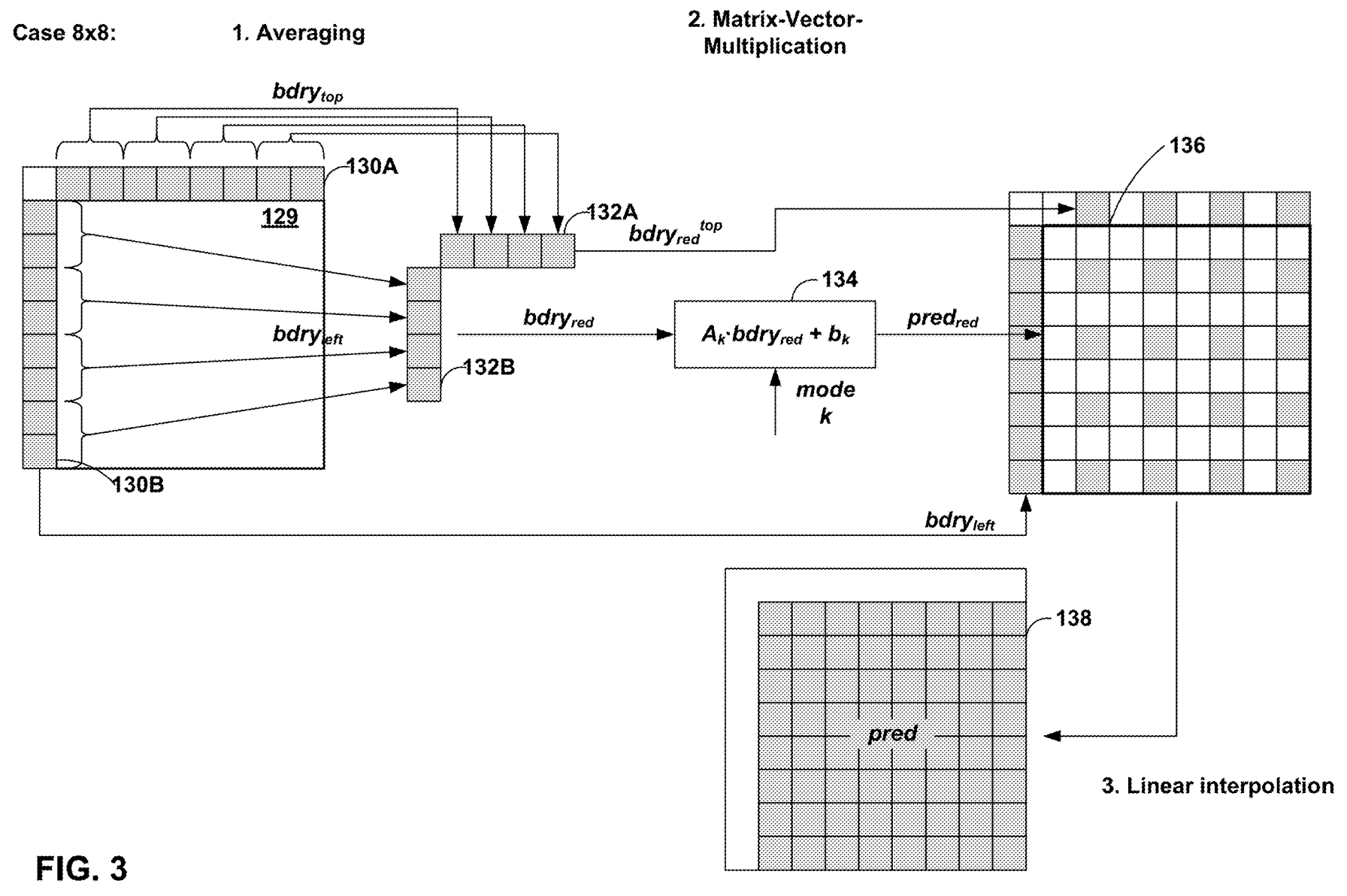

FIG. 3 is a flow diagram illustrating an example of a matrix intra-prediction (MIP) process. The matrix weighted intra prediction (MIP) method is an intra prediction technique in VVC. For predicting the samples of a rectangular block 129 of width W and height H, a video coder (e.g., video encoder 200 or video decoder 300) performing matrix weighted intra prediction (MIP) takes one line of H reconstructed neighbouring boundary samples (samples 130B) left of block 129 and one line of W reconstructed neighbouring boundary samples (samples 130A) above block 129 as input. If the reconstructed samples are unavailable, the video coder generates values for them as is done in conventional intra prediction. The generation of the prediction signal is based on three steps—averaging, matrix vector multiplication, and linear interpolation—as shown in FIG. 3.

In particular, the video coder may average samples 130B to form averaged samples 132B, and average samples 130A to form averaged samples 132A. The video coder may then perform matrix-vector multiplication using averaged samples 132A, 132B to form intermediate prediction block

136. The video coder may then perform linear interpolation on the samples of intermediate prediction block 136 to form prediction block 138.

There are three different size Ids used for the MIP process in VVC. VVC defines an index idx=idx(W, H) as follows:

$$idx(W, H) = \begin{cases} 0 \text{ for } W = H = 4 \\ 1 \text{ for } \max(W, H) = 8 \\ 2 \text{ for } \max(W, H) > 8. \end{cases}$$

For idx=0, 1, and 2, there are 16, 12, and 6 matrices defined, respectively, which also define the number of modes for that given idx. Additionally, each mode can be transposed, where the samples from the left and above are swapped before performing matrix-vector multiplication. So, additionally, the video coder may code a transpose flag (along with the mode signaling) when a CU is coded with MIP, to indicate whether the mode is transposed.

Figure 4:
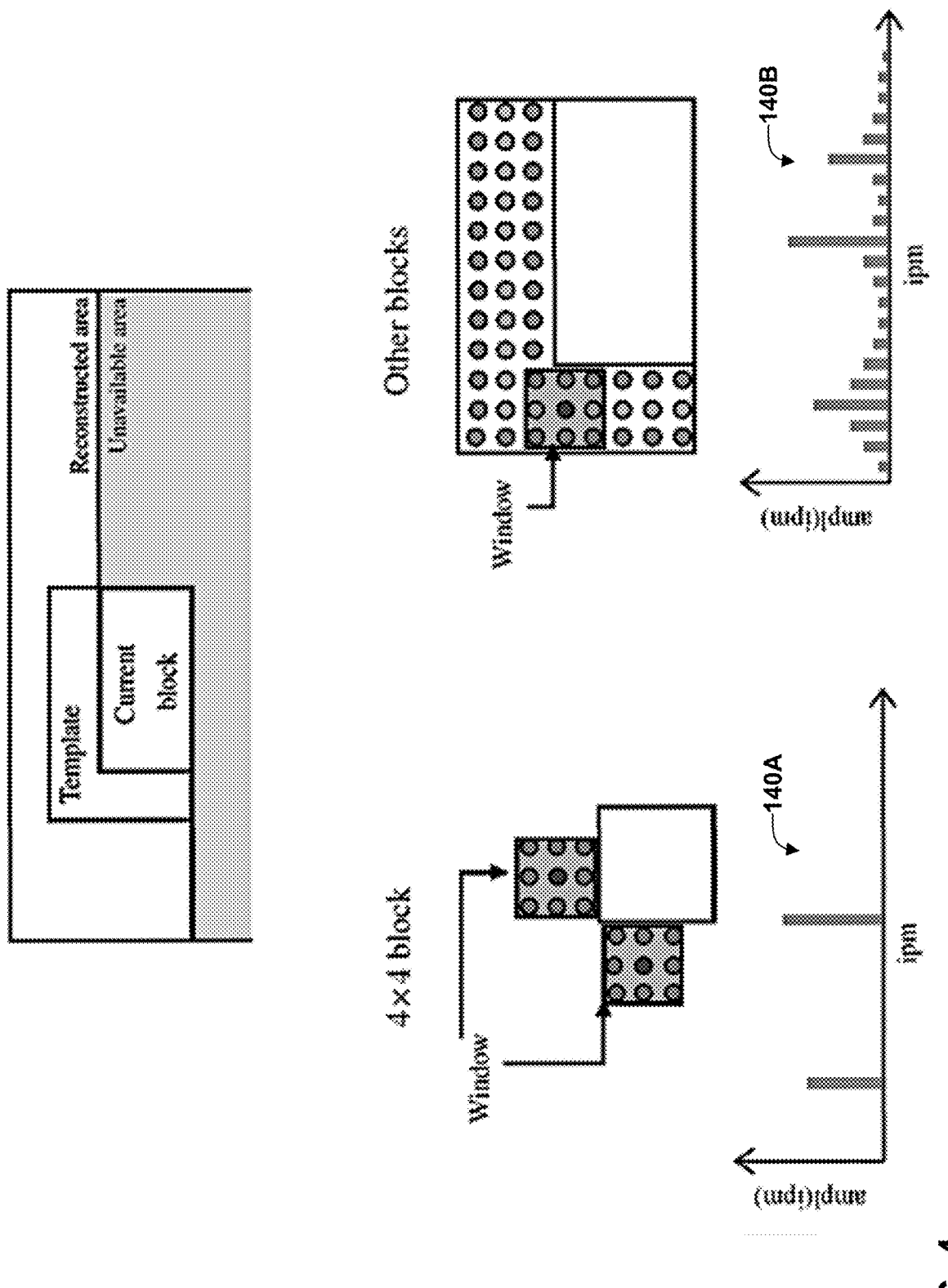
FIG. 4 is a conceptual diagram illustrating examples of constructing histograms for gradient computations for decoder-side intra mode derivation and fused intra prediction (DIMD).
Figure 5:
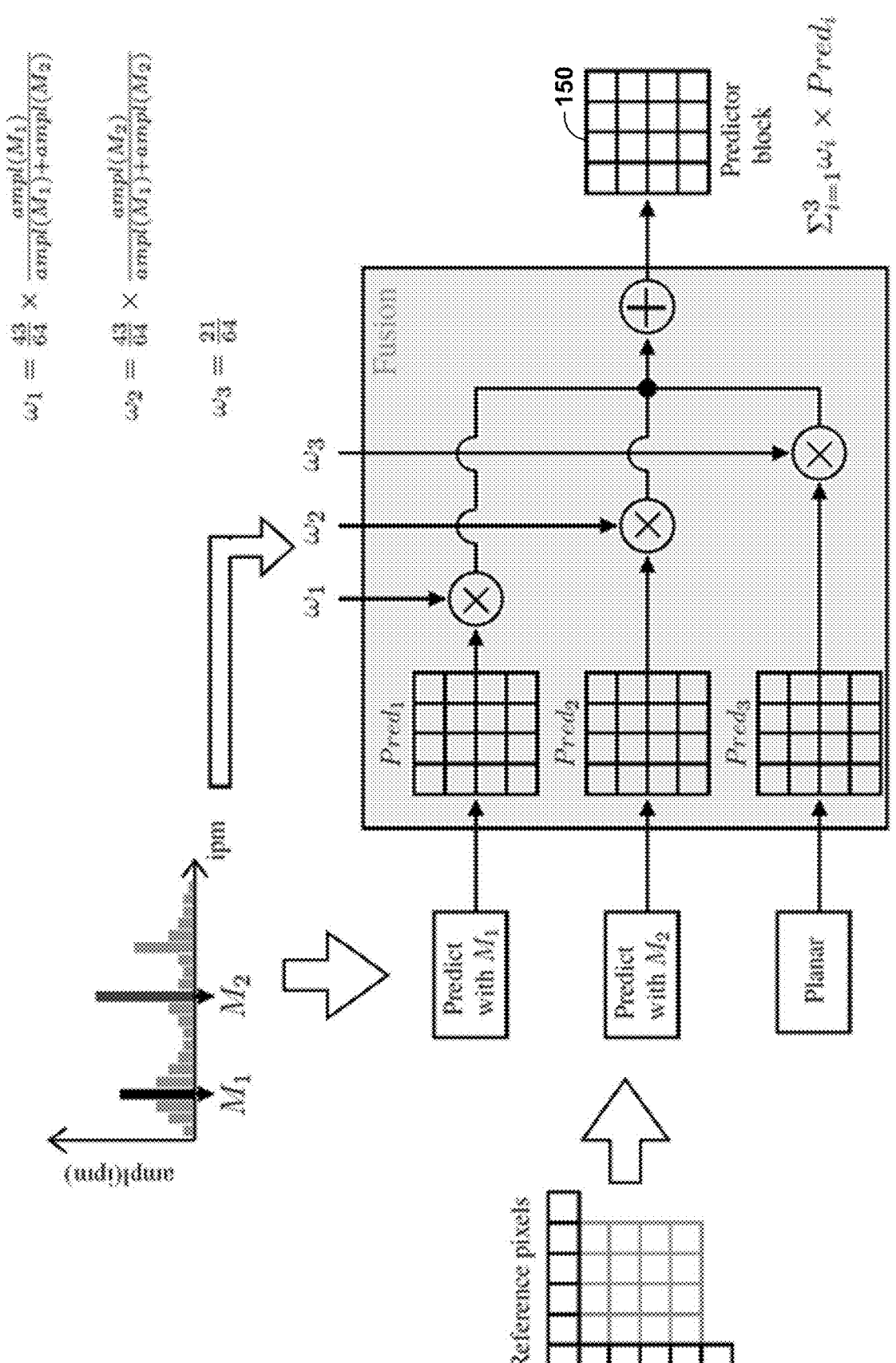
FIG. 5 is a flow diagram illustrating an example weight determination and prediction block generation process for DIMD.

FIG. 4 is a conceptual diagram illustrating examples of constructing histograms 140A, 140B for gradient computations for decoder-side intra mode derivation and fused intra prediction (DIMD). FIG. 5 is a flow diagram illustrating an example weight determination and prediction block generation process for DIMD. Abdoli et al., "Non-CE3: Decoder-side Intra Mode Derivation with Prediction Fusion Using Planar," Joint Video Experts Team (JVET) of ITU-T SG 16 WP 3 and ISO/IEC JTC 1/SC 29/WG 11, 15th Meeting: Gothenburg, SE, 3-12 Jul. 2019, Document No. JVET-O0449-v2, describes performing intra-prediction based on decoder derived intra modes (using already decoded neighboring reconstructed samples) and fusing it with planar predicted samples. In JVET-O0449, two angular modes are selected from a Histogram of Gradient (HoG), computed from the neighboring pixels of a current block. Once the two angular modes are selected, their predictors are computed using conventional angular intra prediction modes (IPMs) and the final predictor of the block. The weights of the planar mode are kept at 21/64 (~=1/3) and the rest of 43/64 is distributed to two angular modes proportionally, based on the corresponding amplitudes in the HoG. HoG is computed by sliding a 3×3 window along left and above neighboring reconstructed samples, as shown in FIG. 4. The final prediction block 150 may be computed using a weighted combination of prediction blocks formed from intra-prediction modes M1, M2, and planar mode.

Figure 6:
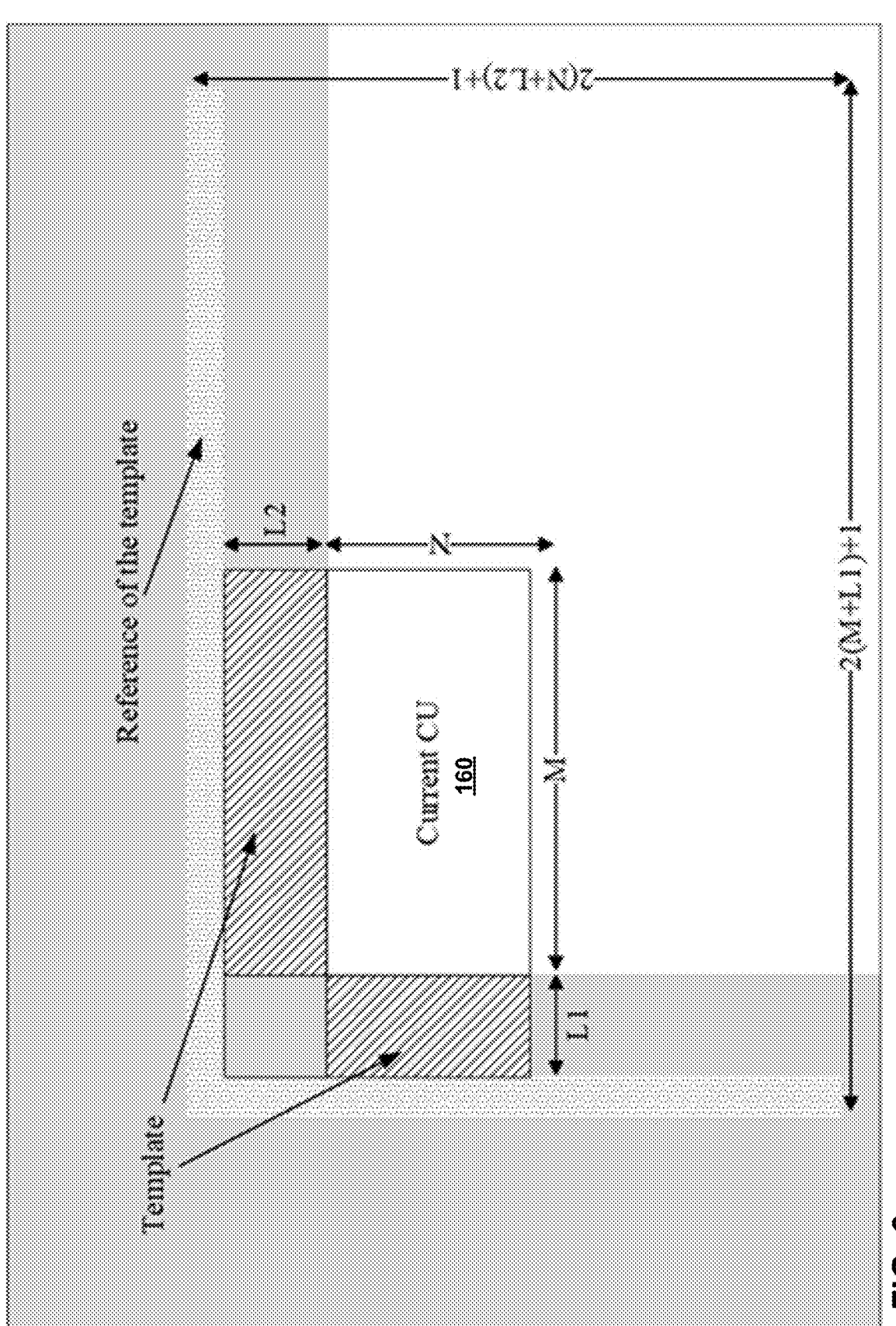
FIG. 6 is a conceptual diagram illustrating a template and reference samples used for template-based intra mode derivation with fusion (TIMD).

FIG. 6 is a conceptual diagram illustrating a template and reference samples used for template-based intra mode derivation with fusion (TIMD). Wang et al., "EE2-related: Template-based intra mode derivation using MPMs," Joint Video Experts Team (JVET) of ITU-T SG 16 WP 3 and ISO/IEC JTC 1/SC 29 22nd Meeting, by teleconference, 20-28 Apr. 2021, Document No. JVET-V0098-v2 proposed another decoder-side intra mode derivation method as a template-based intra mode derivation.

FIG. 6 depicts the general idea for TIMD. Given a current CU 160, a video coder (e.g., video encoder 200 or video decoder 300) selects two template regions (e.g., above current CU 160 and left of current CU 160) and selects the reference samples of the templates correspondingly. For each mode in the MPM list, the video coder may generate a prediction for the template region and compute the sum of absolute transform difference (SATD) cost on the template region between the prediction and the reconstruction samples. The video coder may select the mode with the lowest cost as the mode for TIMD. Also, the video coder may use a number of angular intra modes (including wide angle modes) that is extended (doubled) compared to VVC, i.e., the angles are twice densely arranged.

Furthermore, Cao et al., "EE2-related: Fusion for template-based intra mode derivation," Joint Video Experts Team (WET) of ITU-T SG 16 WP 3 and ISO/IEC JTC 1/SC 29 23rd Meeting, by teleconference, 7-16 Jul. 2021, Document No JVET-W0123-v2, proposed fusion for TIMD. Instead of selecting only one mode with the smallest SATD cost, the video coder may, according to JVET-W0123, choose the first two modes with the smallest SATD costs for the intra modes derived using the TIMD method, then fuse these two modes with weights. The video coder may use such weighted intra prediction to code the current CU. The video coder may compare the costs of the two selected modes with a threshold, applying a cost factor of 2, e.g., as follows:

costMode2<2*costMode1

If this condition is true, the video coder may apply the fusion; otherwise, the video coder may use only mode1.

The video coder may compute weights for the modes from their SATD costs as follows:

weight1=costMode2/(costMode1+costMode2)

weight2=1−weight1

In addition to DCT-II, which has been employed in HEVC, a Multiple Transform Selection (MTS) scheme is used for residual coding both inter and intra coded blocks in VVC. The MTS scheme uses multiple selected transforms from, e.g., DCT8/DST7. The newly introduced transform matrices are DST-7 and DCT-8. Both of these two transform kernels can be applied to both vertical and horizontal transforms, which corresponds to 4 different combinations for horizontal (trHor) and vertical transform (trVer), as follows:

{trVer,trHor}={DST7,DST7},{DST7,DCT8},{DCT8,
    DST7},{DCT8,DCT8}

In JVET-O0449, for a given coding unit, a flag (cu_mts_flag) is signaled to indicate whether DCT2 is used for both trHor and trVer (cu_mts_flag=0) or not (cu_mts_flag=1). If not, then another syntax, named cu_mts_idx, is signaled to indicate which transform combination is used among these four DST7/DCT8 combinations.

JVET-K0375 describes additional transform kernels, including DCT5, DST1, DST4 and an Identity transform. Seven transform sets are defined, and each transform sets have 4 different transform pairs (for {trVer, trHor}). A look-up table is defined to assign each of the 7 transform sets based on different intra prediction modes and block sizes. The 7 transform sets are designed as:

$T_{0,intra}$={(DST-4,DST-4),(DST-7,DST-7),(DST-4,
    DCT-8),(DCT-8,DST-4)}

$T_{1,intra}$={(DST-7,DST-7),(DST-7,DCT-5),(DCT-5,
    DST-7),(DST-1,DCT-5)}

$T_{2,intra}$={(DST-7,DST-7),(DST-7,DCT-8),(DCT-8,
    DST-7),(DCT-5,DCT-5)}

$T_{3,intra}$={(DST-4,DST-4),(DST-4,DCT-5),(DCT-8,
    DST-4),(DST-1,DST-7)}

$T_{4,intra}$={(DST-4,DST-7),(DST-7,DCT-5),(DCT-8,
    DST-7),(DST-1,DST-7)}

$$T_{5,intra}=\{(DST\text{-}7,DST\text{-}7),(DST\text{-}7,DCT\text{-}5),(DCT\text{-}8,$$
$$DST\text{-}7),(DST\text{-}1,DST\text{-}7)\}$$

$$T_{6,intra}=\{(DST\text{-}7,DST\text{-}7),(DST\text{-}7,DCT\text{-}5),(DCT\text{-}5,$$
$$DST\text{-}7),(DST\text{-}1,DST\text{-}7)\}$$

In JVET-K0375, an identity transform is applied for blocks that are do not exceed 16×16 and have intra modes within the proximity of horizontal and vertical intra directions, where the proximity is defined by a block size-based threshold. If the transform index is equal to 3 and the block satisfies the above condition, the horizontal and/or vertical identity transform is applied.

According to the techniques of this disclosure, video encoder 200 and video decoder 300 may be configured to select an MTS scheme according to a block size and an intra-prediction mode for the block. Video encoder 200 and video decoder 300 may classify a block into one of sixteen different size groups based on both width and height, e.g., as shown in Table 1 below, where size group is represented as {W×H}, where W represents width in samples and H represents height in samples:

TABLE 1

| | | | |
|---|---|---|---|
| 0→{4 × 4} | 1→{4 × 8} | 2→{4 × 16} | 3→{4 × N} |
| 4→{8 × 4} | 5→{8 × 8} | 6→{8 × 16} | 7→{8 × N} |
| 8→{16 × 4} | 9→{16 × 8} | 10→{16 × 16} | 11→{16 × N} |
| 12→{N × 4} | 13→{N × 8} | 14→{N × 16} | 15→{N × N} |

In the above, N is an integer value that is a power of 2 and greater than 16 (e.g., greater than or equal to 32).

Video encoder 200 and video decoder 300 may, additionally or alternatively, classify the prediction mode into one of a plurality of intra-prediction mode groups (e.g., five mode-groups) based on intra-prediction mode information. Table 2 below represents an example of the mode group classifications:

TABLE 2

| Mode group | Intra mode Id |
|---|---|
| 0 | 0 <= intramode <= 1 |
| 1 | 2 <= intramode <= 12 |
| 2 | 13 <= intramode <= 23 |
| 3 | 24 <= intramode <= 34 |
| 4 | MIP mode |

In examples where both size groups (e.g., 16 size groups) and mode groups (e.g., 5 mode groups) are used, in total, 16*5=80 groups may be considered. Thus, an intra-prediction mode and block size may correspond to a particular group of available MTS schemes. An MTS scheme generally represents a combination of transforms, e.g., a horizontal transform and a vertical transform. All possible MTS schemes may be divided into sets of available MTS schemes for particular groups of block characteristics, e.g., size groups and/or mode groups. Each size and/or mode group may have four MTS schemes (transform pair) choices, which may correspond to different signaled values of an MTS index, e.g., cu_mts_idx. Thus, cu_mts_idx may have a value in {0, 3}, inclusive, representing a particular MTS scheme in a group of available MTS schemes, which is determined according to a size and intra-prediction mode for the current block. In particular, the group of available MTS schemes may be determined according to a size group including the size of the block (e.g., per Table 1) and/or a mode group including the intra-prediction mode (e.g., per Table 2) for the current block.

In some examples, the number of transform pairs can depend on the block shape (e.g., whether the width is larger than the height) and/or a quantization parameter of the corresponding transform block.

Additionally, in some examples, video encoder 200 and video decoder 300 may be configured to use a joint mode and block symmetry for a transform pair design. For example, a mode i (i>34) with block shape A×B will be mapped to the same group corresponding to the (68−i) with block shape B×A. However, for each transform pair in that group, the vertical and horizontal transform will be swapped.

In other words, if a first block has a size of W×H, is predicted using intra-prediction mode i, and is transformed using a transform pair of a horizontal transform and a vertical transform, video encoder 200 and video decoder 300 may select the same transform pair for a second block having a size of H×W and predicted using intra-prediction mode (68−i), but applying the horizontal transform as a vertical transform and the vertical transform as a horizontal transform.

For example, suppose a 16×4 block with mode 18 (horizontal prediction) is mapped to a group, and the signaled cu_mts_idx corresponding to a transform pair {trVer, trHor}={DCT8, DST7}. Then, a 4×16 block with mode 50 (vertical prediction) will be mapped to the same group and with the same cu_mts_idx, the transform pair would be {trVer, trHor}={DST7, DCT8}.

For a MIP coded block, video encoder 200 and video decoder 300 may use the corresponding transpose flag along with block shape symmetry to determine the MTS scheme. For example, video encoder 200 and video decoder 300 may map a MIP coded block with shape A×B with MIP transpose flag on to the same group as that of block shape B×A and with MIP transpose flag off.

If the block is coded with DIMD mode, video encoder 200 and video decoder 300 may use the dominant angular mode (having the highest weight) to derive the transform pairs. Alternatively, if the difference between two angular mode values is higher than a threshold, video encoder 200 and video decoder 300 may treat the mode as a planar mode (mode 0) to determine the MTS kernels. Otherwise, if the difference between the two angular mode values is less than or equal to the threshold, video encoder 200 and video decoder 300 may use only a dominant mode to determine MTS kernels.

For the wide-angle intra-prediction modes, video encoder 200 and video decoder 300 may use the nearest conventional angular mode for transform set determination. For example, video encoder 200 and video decoder 300 may use mode 2 for all modes between −2 and −14. Similarly, video encoder 200 and video decoder 300 may use mode 66 for mode 67 to mode 80.

An example of a mapping table is shown in Table 3 below for deriving an MTS group according to a prediction mode and block size (shape):

TABLE 3

| Size ‖ mode | [0, 1] | [2-12] | [13-23] | [24-34] | MIP |
|---|---|---|---|---|---|
| 4 × 4 | 0 | 1 | 2 | 3 | 4 |
| 4 × 8 | 5 | 6 | 7 | 8 | 9 |
| 4 × 16 | 10 | 11 | 12 | 13 | 14 |
| 4 × N | 15 | 16 | 17 | 18 | 19 |
| 8 × 4 | 20 | 21 | 22 | 23 | 24 |
| 8 × 8 | 25 | 26 | 27 | 28 | 29 |
| 8 × 16 | 30 | 31 | 32 | 33 | 34 |

TABLE 3-continued

| Size ‖ mode | [0, 1] | [2-12] | [13-23] | [24-34] | MIP |
|---|---|---|---|---|---|
| 8 × N | 35 | 36 | 37 | 38 | 39 |
| 16 × 4 | 40 | 41 | 42 | 43 | 44 |
| 16 × 8 | 45 | 46 | 47 | 48 | 49 |
| 16 × 16 | 50 | 51 | 52 | 53 | 54 |
| 16 × N | 55 | 56 | 57 | 58 | 59 |
| 32 × 4 | 60 | 61 | 62 | 63 | 64 |
| 32 × 8 | 65 | 66 | 67 | 68 | 69 |
| 32 × 16 | 70 | 71 | 72 | 73 | 74 |
| 32 × N | 75 | 76 | 77 | 78 | 79 |

The following is an example mapping of a transform pair index to a corresponding transform pair (i.e., MTS scheme):

```
const uint8_t g_aucTrIdxToTr[25][2]=
{
  {DCT8, DCT8 },{ DCT8, DST7 }, { DCT8, DCT5 }, { DCT8, DST4 },
  {DCT8, DST1}, { DST7, DCT8 }, { DST7, DST7 }, { DST7, DCT5 },
  {DST7, DST4 }, {DST7, DST1}, { DCT5, DCT8 }, { DCT5, DST7 },
  {DCT5, DCT5 }, { DCT5, DST4 }, {DCT5, DST1}, { DST4, DCT8 },
  {DST4, DST7 }, { DST4, DCT5 }, { DST4, DST4 }, {DST4, DST1},
  {DST1, DCT8 }, { DST1, DST7 }, { DST1, DCT5 }, { DST1, DST4 },
  {DST1, DST1},
};
```

The following is an example mapping of each of a set of four different transform pair indexes to a corresponding transform pair (i.e., MTS scheme):

```
const uint8_t g_aucTrSet[80][4]=
{ { 17, 18, 23, 24},
  { 3, 7, 18, 22},
  { 2, 17, 18, 22},
  { 3, 15, 17, 18},
  { 3, 12, 18, 19},
  { 12, 18, 19, 23},
  { 2, 12, 17, 18},
  { 2, 17, 18, 22},
  { 2, 11, 17, 18},
  { 12, 18, 19, 23},
  { 12, 13, 16, 24},
  { 2, 11, 16, 23},
  { 2, 13, 17, 22},
  { 2, 11, 17,21},
  { 13, 16, 19, 22},
  { 7, 12, 13, 18},
  { 1, 11, 12, 16},
  { 3, 13, 17, 22},
  { 1, 6, 12, 22},
  { 12, 13, 15, 16},
  { 18, 19, 23, 24},
  { 2, 17, 18, 24},
  { 3, 4, 17, 22},
  { 12, 18, 19, 23},
  { 6, 12, 18, 24},
  { 2, 6, 12, 21},
  { 1, 11, 17, 22},
  { 3, 11, 16, 17},
  { 8, 12, 19, 23},
  { 7, 13, 16, 23},
  { 1, 6, 11, 12},
  { 1, 11, 17,21},
  { 6, 11, 17,21},
  { 8, 11, 14, 17},
  { 6, 11, 12,21},
  { 1, 6, 11, 12},
  { 2, 6, 11, 12},
  { 1, 6, 11, 21},
  { 7, 11, 12, 16},
  { 8, 12, 19, 24},
  { 1, 13, 18, 22},
  { 2, 6, 17, 21},
  { 11, 12, 16, 19},
```

-continued

```
  { 8, 12, 17, 24},
  { 6, 12, 19,21},
  { 6,12, 13,21},
  { 2, 16, 17,21},
  { 6, 17, 19, 23},
  { 6, 12, 14, 17},
  { 6, 7, 11, 21},
  { 1, 11, 12, 16},
  { 1, 6, 11, 12},
  { 6, 11, 12,21},
  { 7, 8, 9, 11},
  { 6, 7, 11, 12},
  { 6, 7, 11, 12},
  { 1, 11, 12, 16},
  { 6, 11, 17, 21},
  { 6, 7, 11, 12},
  { 12, 14, 18, 21},
  { 1, 11, 16, 22},
  { 1, 11, 16, 22},
  { 7, 13, 15, 16},
  { 1, 8, 12, 19},
  { 6, 7, 9, 12},
  { 2, 6, 12, 13},
  { 1, 12, 16, 21},
  { 7, 11, 16, 19},
  { 7, 8, 11, 12},
  { 6, 7, 11, 12},
  { 6, 7, 11, 12},
  { 1, 6, 11, 12},
  { 6, 7, 11, 16},
  { 6, 7, 11, 12},
  { 6, 7, 11, 12},
  { 6, 11, 12, 21},
  { 1, 6, 11, 12},
  { 6, 7, 11, 12},
  { 6, 7, 11, 12},};
```

In the examples above, the g_aucTrIdxToTr data structure represents a collection of 25 possible MTS schemes (transform pairs). These MTS schemes are associated with respective index values from 1 to 25. The g_aucTrSet data structure represents a collection of 80 different sets of MTS schemes. In particular, the values in each of the sets of MTS schemes corresponds to an index into the g_aucTrIdxToTr data structure. The size of a block (e.g., a size group) and an intra-prediction mode (e.g., a mode group) for the block jointly may be mapped to one of the entries of the g_aucTrIdxToTr data structure. Video encoder 200 and video decoder 300 may further code a transform index, representing an index value (0, 1, 2, or 3) into the set of available MTS schemes, i.e., the one of the entries of the g_aucTrIdxToTr data structure to which the block size and intra-prediction mode are mapped. Video decoder 300 may use the decoded index value to determine one of the indices in the set of entries of the g_aucTrIdxToTr data structure, then use the determined one of the indices from the set of entries in the g_aucTrIdxToTr data structure to determine a corresponding MTS scheme, e.g., using the g_aucTrSet data structure.

For example, if the size of the current block is 4×4 and the intra-prediction mode is either mode 0 or mode 1, the size and intra-prediction mode for the current block are mapped (per Table 3) to the first entry of the g_aucTrIdxToTr data structure (i.e., {17, 18, 23, 24}). If the decoded transform index has a value of 0, video decoder 300 may determine that the one of the indices is 17. Using the g_aucTrSet data structure, video decoder 300 may then determine that the MTS scheme is the 17$^{th}$ transform pair, i.e., {DST4, DST7}. As another example, if the size of the current block is 4×16 and the intra-prediction mode for the current block is either mode 0 or mode 1, the size and intra-prediction mode for the current block are mapped to the tenth entry of the g_auc-TrIdxToTr data structure (i.e., {12, 18, 19, 23}), per Table 3. If the decoded transform index has a value of 3, video decoder 300 may determine that the one of the indices is 23. Using the g_aucTrSet data structure, video decoder 300 may determine that the MTS scheme is the $23^{rd}$ transform pair, i.e., {DST1, DCT5}.

As discussed above, in some examples, when TIMD is activated, video encoder 200 and video decoder 300 may use an extended (e.g., doubled) number of intra modes. That is, the angles of the intra modes may be arranged in a twice-dense fashion. Various techniques for deriving the transform kernel are described below.

In one example, when TIMD mode includes one intra mode for intra prediction (i.e., without fusion), video encoder 200 or video decoder 300 may map that intra mode to the VVC intra-mode having a closest angle (selected from one of 67+ wide angle modes of VVC). Subsequently, video encoder 200 or video decoder 300 may use the mapped mode for determining the MTS kernels. If the VVC intra-mode is a subset of the extended intra-modes (i.e., every alternate intra-mode in extended set corresponds to VVC intra-mode) then this conversion may be as follows (mode 0 and mode 1 are non-angular modes, so the conversion does not impact the value for those modes):

$$mode=(mode<2? mode:((mode>>1)+1))$$

When TIMD mode uses fusion (two modes involved for generating final intra prediction), video encoder 200 or video decoder 300 may map only the dominant mode (having lower distortion) to a VVC intra-mode to determine MTS kernels.

According to conventional error concealment mode (ECM), a video coder such as video encoder 200 or video decoder 300 would employ low frequency non-separable transforms (LFNST) based on an intra-mode. According to the techniques of this disclosure, video encoder 200 or video decoder 300 may be configured to apply the techniques discussed above to the LFNST transform kernels as well.

In another example, a look-up table (LUT) or mapping table for mapping an intra-mode to transform kernels can be specified when TIMD mode is used. The table may be specified for extended (doubled) angles, and video encoder 200 and video decoder 300 may be configured with this table.

When video encoder 200 or video decoder 300 applies TIMD with fusion (i.e., two modes are involved for generating the final intra prediction), video encoder 200 and video decoder 300 may use only the dominant mode to determine the MTS kernels.

Alternatively, when the difference between two mode values is higher than a threshold, video encoder 200 and video decoder 300 may treat the mode as a planar mode (mode 0) to determine the MTS kernels. Otherwise, if the difference is less than or equal to the threshold, video encoder 200 and video decoder 300 may only use the dominant mode to determine the MTS kernels.

In another example, when TIMD mode is used, video encoder 200 and video decoder 300 may disable MTS, i.e., only DCT2 can be used for TIMD. In this case, video encoder 200 may avoid signaling mts_idx, and video decoder 300 may determine that mts_idx is not signaled and instead infer a value for mts_idx. This disabling can also be dependent on block size, e.g., MTS may be disabled for certain block sizes. Similarly, LFNST can also be disabled when TIMD coding is used, optionally in combination with a block-size restriction.

Figure 7:
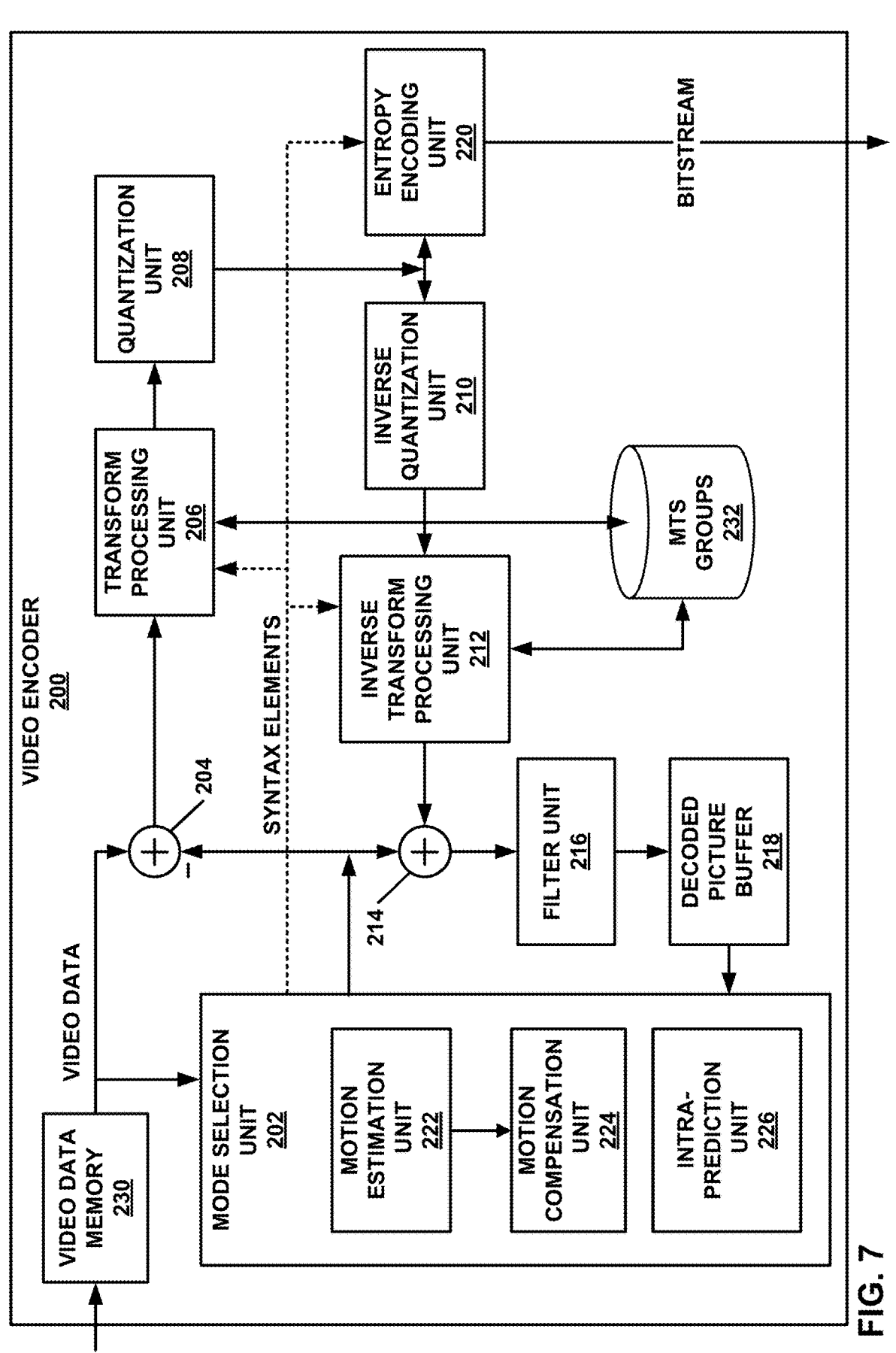
FIG. 7 is a block diagram illustrating an example video encoder that may perform the techniques of this disclosure.

FIG. 7 is a block diagram illustrating an example video encoder 200 that may perform the techniques of this disclosure. FIG. 7 is provided for purposes of explanation and should not be considered limiting of the techniques as broadly exemplified and described in this disclosure. For purposes of explanation, this disclosure describes video encoder 200 according to the techniques of VVC (ITU-T H.266, under development) and HEVC (ITU-T H.265). However, the techniques of this disclosure may be performed by video encoding devices that are configured to other video coding standards and video coding formats, such as AV1 and successors to the AV1 video coding format.

In the example of FIG. 7, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, multiple transform selection (MTS) groups 232, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, MTS groups 232, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 7 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed.

For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the MTT structure, QTBT structure, superblock structure, or the quadtree structure described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

When operating according to the AV1 video coding format, motion estimation unit 222 and motion compensation unit 224 may be configured to encode coding blocks of video data (e.g., both luma and chroma coding blocks) using translational motion compensation, affine motion compensation, overlapped block motion compensation (OBMC), and/or compound inter-intra prediction.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

When operating according to the AV1 video coding format, intra prediction unit 226 may be configured to encode coding blocks of video data (e.g., both luma and chroma coding blocks) using directional intra prediction, non-directional intra prediction, recursive filter intra prediction, chroma-from-luma (CFL) prediction, intra block copy (IBC), and/or color palette mode. Mode selection unit 202 may include additional functional units to perform video prediction in accordance with other prediction modes.

Mode selection unit 202 provides the prediction block to residual generation unit 204. Residual generation unit 204 receives a raw, uncoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

In accordance with the techniques of this disclosure, transform processing unit 206 may receive data representing a size and prediction mode (e.g., an intra-prediction mode) for a current block of video data. Transform processing unit 206 may determine an MTS group from MTS groups 232 according to the size and the prediction mode of the current block. For example, transform processing unit 206 may determine a size group including the size of the current block, e.g., according to Table 1 as discussed above. As another example, in addition or in the alternative, transform processing unit 206 may determine a mode group including the intra-prediction mode for the current block, e.g., per Table 2 above. Transform processing unit 206 may then select an MTS group from MTS groups 232 to which the size and intra-prediction mode (e.g., size group and/or mode group) are mapped, e.g., as discussed above with respect to Table 3. Likewise, in some examples, transform processing unit 206 may take advantage of symmetry of block size and/or intra-prediction modes, where an M×N sized block may be mapped to the same MTS group as an N×M sized block, e.g., as discussed above.

Transform processing unit 206 may evaluate each of the MTS schemes in the determined MTS group. Transform processing unit 206 may select one of the MTS schemes from the group that results in a lowest energy transform block (e.g., a transform block having the most zero-valued coefficients or having a lowest average coefficient value). Transform processing unit 206 may then send an index value to entropy encoding unit 220 to be encoded as a transform index, where the transform index identifies the determined MTS scheme in the MTS group. Transform processing unit 206 may also provide the index value to inverse transform processing unit 212.

When operating according to AV1, transform processing unit 206 may apply one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a horizontal/vertical transform combination that may include a discrete cosine transform (DCT), an asymmetric discrete sine transform (ADST), a flipped ADST (e.g., an ADST in reverse order), and an identity transform (IDTX). When using an identity transform, the transform is skipped in one of the vertical or horizontal directions. In some examples, transform processing may be skipped.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

In accordance with the techniques of this disclosure, inverse transform processing unit 212 may receive data representing a size and prediction mode (e.g., an intra-prediction mode) for a current block of video data. Inverse transform processing unit 212 may determine an MTS group from MTS groups 232 according to the size and the prediction mode of the current block. For example, inverse transform processing unit 212 may determine a size group including the size of the current block, e.g., according to Table 1 as discussed above. As another example, in addition or in the alternative, inverse transform processing unit 212 may determine a mode group including the intra-prediction mode for the current block, e.g., per Table 2 above. Inverse transform processing unit 212 may further receive a transform index from transform processing unit 206. Using the transform index, inverse transform processing unit 212 may determine an MTS scheme in the MTS group from MTS groups 232 to which the size and intra-prediction mode (e.g., size group and/or mode group) are mapped, e.g., as discussed above with respect to Table 3. Likewise, in some examples, inverse transform processing unit 212 may take advantage of symmetry of block size and/or intra-prediction modes, where an M×N sized block may be mapped to the same MTS group as an N×M sized block, e.g., as discussed above. Inverse transform processing unit 212 may inverse transform the transform block using the determined MTS scheme.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

When operating according to AV1, filter unit 216 may perform one or more filter operations on reconstructed blocks. For example, filter unit 216 may perform deblocking operations to reduce blockiness artifacts along edges of CUs. In other examples, filter unit 216 may apply a constrained directional enhancement filter (CDEF), which may be applied after deblocking, and may include the application of non-separable non-linear low-pass directional filters based on estimated edge directions. Filter unit 216 may also include a loop restoration filter, which is applied after CDEF, and may include a separable symmetric normalized Wiener filter or a dual self-guided filter.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

In accordance with AV1, entropy encoding unit 220 may be configured as a symbol-to-symbol adaptive multi-symbol arithmetic coder. A syntax element in AV1 includes an alphabet of N elements, and a context (e.g., probability model) includes a set of N probabilities. Entropy encoding unit 220 may store the probabilities as n-bit (e.g., 15-bit) cumulative distribution functions (CDFs). Entropy encoding unit 22 may perform recursive scaling, with an update factor based on the alphabet size, to update the contexts.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 may be configured to apply any of the techniques of this disclosure for determining and signaling an MTS scheme for a block of video data.

Figure 8:
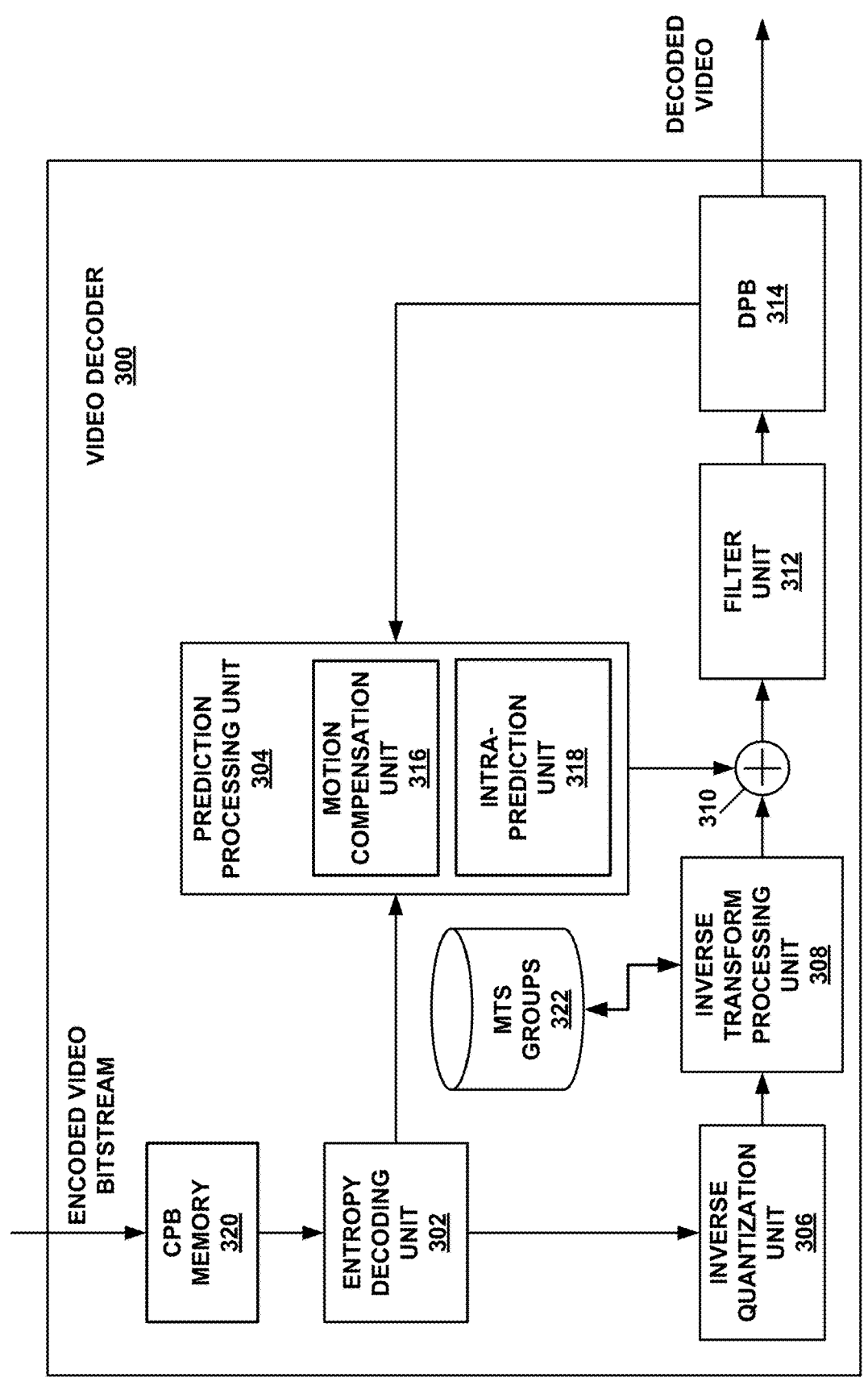
FIG. 8 is a block diagram illustrating an example video decoder that may perform the techniques of this disclosure.

FIG. 8 is a block diagram illustrating an example video decoder 300 that may perform the techniques of this disclosure. FIG. 8 is provided for purposes of explanation and is not limiting on the techniques as broadly exemplified and described in this disclosure. For purposes of explanation, this disclosure describes video decoder 300 according to the techniques of VVC (ITU-T H.266, under development) and HEVC (ITU-T H.265). However, the techniques of this disclosure may be performed by video coding devices that are configured to other video coding standards.

In the example of FIG. 8, video decoder 300 includes coded picture buffer (CPB) memory 320, entropy decoding unit 302, prediction processing unit 304, inverse quantization unit 306, inverse transform processing unit 308, reconstruction unit 310, filter unit 312, MTS groups 322, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, MTS groups 322, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

When operating according to AV1, compensation unit 316 may be configured to decode coding blocks of video data (e.g., both luma and chroma coding blocks) using translational motion compensation, affine motion compensation, OBMC, and/or compound inter-intra prediction, as described above. Intra prediction unit 318 may be configured to decode coding blocks of video data (e.g., both luma and chroma coding blocks) using directional intra prediction, non-directional intra prediction, recursive filter intra prediction, CFL, intra block copy (IBC), and/or color palette mode, as described above.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 8 are illustrated to assist with understanding the operations performed by video decoder 300. The units may be implemented as fixed-function circuits, programmable circuits, or a combination thereof. Similar to FIG. 7, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

In accordance with the techniques of this disclosure, inverse transform processing unit 308 may receive data representing a size and prediction mode (e.g., an intra-prediction mode) for a current block of video data from entropy decoding unit 302 and/or prediction processing unit 304. Inverse transform processing unit 308 may determine an MTS group from MTS groups 322 according to the size and the prediction mode of the current block. For example, inverse transform processing unit 308 may determine a size group including the size of the current block, e.g., according to Table 1 as discussed above. As another example, in addition or in the alternative, inverse transform processing unit 308 may determine a mode group including the intra-prediction mode for the current block, e.g., per Table 2 above. Inverse transform processing unit 308 may further receive a transform index from entropy decoding unit 302. Using the transform index, inverse transform processing unit 308 may determine an MTS scheme in the MTS group from MTS groups 322 to which the size and intra-prediction mode (e.g., size group and/or mode group) are mapped, e.g., as discussed above with respect to Table 3. Likewise, in some examples, inverse transform processing unit 308 may take advantage of symmetry of block size and/or intra-prediction modes, where an M×N sized block may be mapped to the same MTS group as an N×M sized block, e.g., as discussed above. Inverse transform processing unit 308 may inverse transform the transform block using the determined MTS scheme.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 7).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 7). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a device for decoding video data including a memory configured to store video data; and one or more processors implemented in circuitry and configured to: determine a size of a current block of video data; determine an intra-prediction mode for the current block of video data; determine a mode group including the determined intra-prediction mode, the mode group being one of a plurality of mode groups, each of the mode groups in the plurality of mode groups including respective sets of intra-prediction modes such that each possible intra-prediction mode is included in no more than one of the mode groups; determine a set of available multiple transform selection (MTS) schemes for the current block according to the size and the intra-prediction mode for the current block, the set of available MTS schemes being one set of available MTS schemes of a plurality of sets of MTS schemes; determine an MTS scheme from the set of available MTS schemes according to the determined mode group; apply transforms of the MTS scheme to a transform block of the current block to produce a residual block for the current block; and decode the current block using the residual block.

Figure 9:
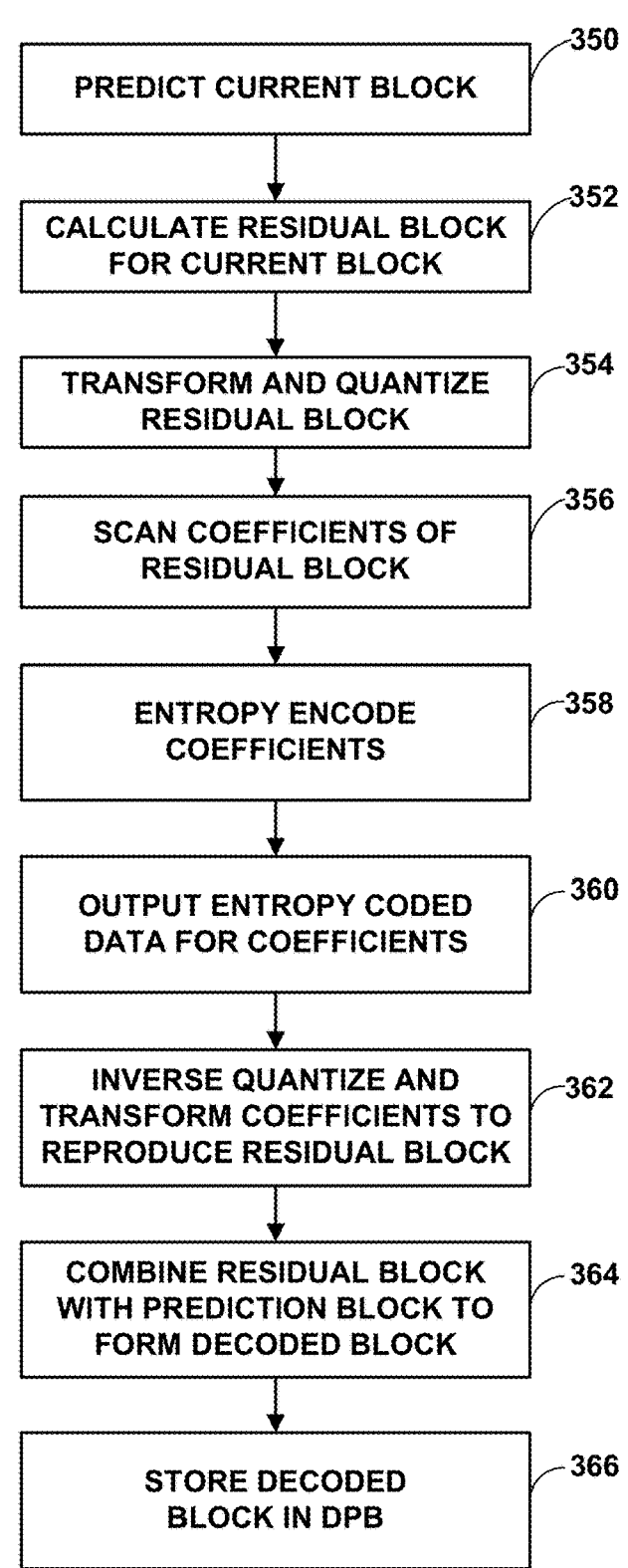
FIG. 9 is a flowchart illustrating an example method for encoding a current block in accordance with the techniques of this disclosure.

FIG. 9 is a flowchart illustrating an example method for encoding a current block in accordance with the techniques of this disclosure. The current block may comprise a current CU. Although described with respect to video encoder 200 (FIGS. 1 and 7), it should be understood that other devices may be configured to perform a method similar to that of FIG. 9.

In this example, video encoder 200 initially predicts the current block (350). For example, video encoder 200 may form a prediction block for the current block using an intra-prediction mode. Video encoder 200 may then calculate a residual block for the current block (352). To calculate the residual block, video encoder 200 may calculate a difference between the original, uncoded block and the prediction block for the current block. Video encoder 200 may then transform the residual block and quantize transform coefficients of the residual block (354). In particular, video encoder 200 may determine an MTS scheme to apply to the residual block according to any of the various techniques of this disclosure, e.g., according to a size of the block and the intra-prediction mode for the block. Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360).

Video encoder 200 may also decode the current block after encoding the current block, to use the decoded version of the current block as reference data for subsequently coded data (e.g., in inter- or intra-prediction modes). Thus, video encoder 200 may inverse quantize and inverse transform the coefficients to reproduce the residual block (362). Video encoder 200 may combine the residual block with the prediction block to form a decoded block (364). Video encoder 200 may then store the decoded block in DPB 218 (366).

Figure 10:
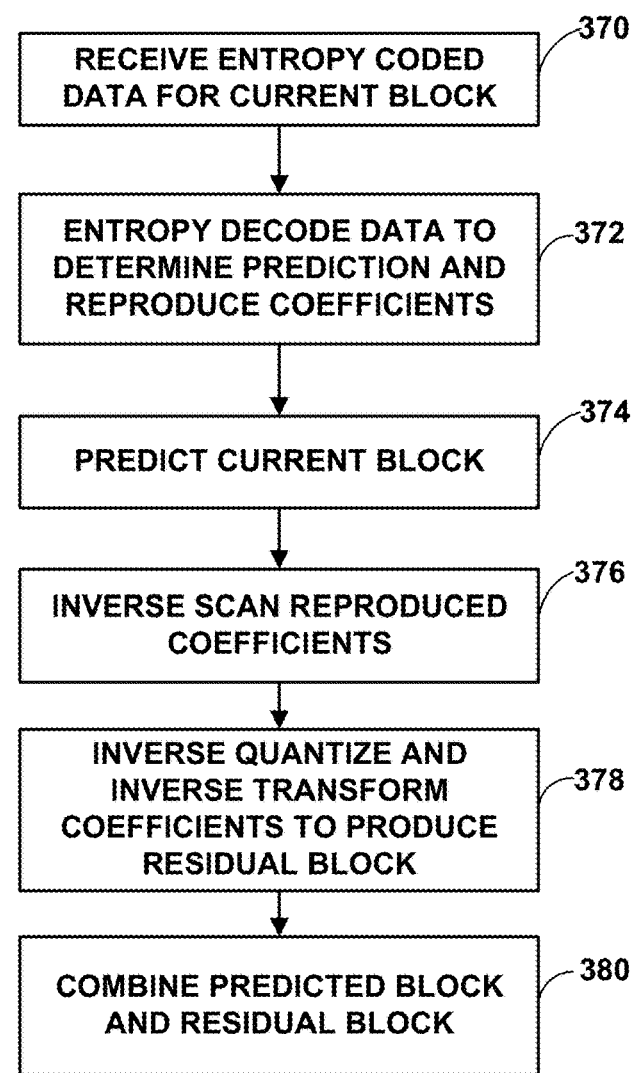
FIG. 10 is a flowchart illustrating an example method for decoding a current block in accordance with the techniques of this disclosure.

FIG. 10 is a flowchart illustrating an example method for decoding a current block of video data in accordance with the techniques of this disclosure. The current block may comprise a current CU. Although described with respect to video decoder 300 (FIGS. 1 and 8), it should be understood that other devices may be configured to perform a method similar to that of FIG. 10.

Video decoder 300 may receive entropy encoded data for the current block, such as entropy encoded prediction information and entropy encoded data for transform coefficients of a residual block corresponding to the current block (370). Video decoder 300 may entropy decode the entropy encoded data to determine prediction information for the current block and to reproduce transform coefficients of the residual block (372). Video decoder 300 may predict the current block (374), e.g., using an intra-prediction mode as indicated by the prediction information for the current block, to calculate a prediction block for the current block. Video decoder 300 may then inverse scan the reproduced transform coefficients (376), to create a block of quantized transform coefficients. Video decoder 300 may use the intra-prediction mode and a size of the block to determine an MTS scheme for the block according to any of the various techniques of this disclosure. Video decoder 300 may then inverse quantize the transform coefficients and apply an inverse transform to the transform coefficients, using the MTS scheme, to produce a residual block (378). Video decoder 300 may ultimately decode the current block by combining the prediction block and the residual block (380).

Figure 11:
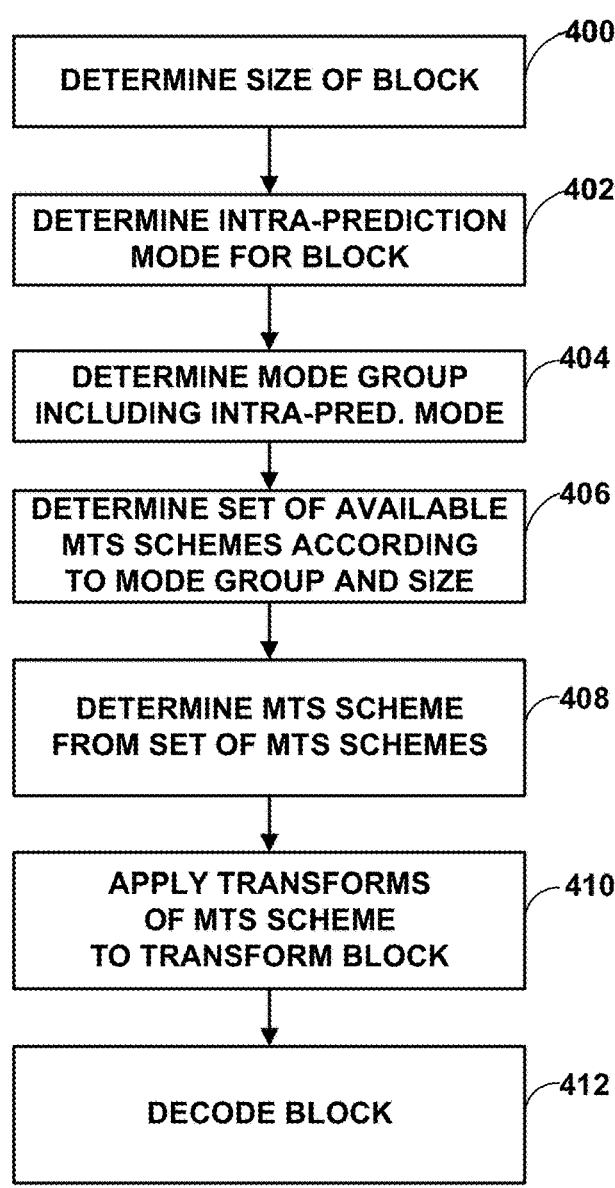
FIG. 11 is a flowchart illustrating another example method of decoding a block of video data according to techniques of this disclosure.

FIG. 11 is a flowchart illustrating an example method of decoding a block of video data according to techniques of this disclosure. The method of FIG. 11 may be performed by video decoder 300 (FIGS. 1 and 8) and is explained with respect to video decoder 300 for purposes of example. Video encoder 200 of FIGS. 1 and 7 and other video coding (encoding and/or decoding devices) may be configured to perform this or a similar method. The method of FIG. 11 may be performed as part of the method of FIG. 9 (e.g., steps 354 and/or 362) or as part of the method of FIG. 10 (e.g., step 378).

Initially, video decoder 300 determines a size of a current block of video data (400). For example, video decoder 300 may determine a width W and a height H of the current block, where W and H represent a number of samples along the corresponding dimension of the current block. Video decoder 300 may also determine a current intra-prediction mode for the current block (402). For example, video decoder 300 may decode one or more intra-prediction mode syntax elements representing the intra-prediction mode for the current block. Alternatively, video decoder 300 may use any of the various techniques discussed above with respect to FIGS. 3-6 to determine the intra-prediction mode.

Video decoder 300 may then determine a mode group including the determined intra-prediction mode (404). For example, video decoder 300 may determine the mode group according to Table 2 as discussed above. In other examples, other mode groupings, which may include more or fewer groups and/or more or fewer modes in each group, may be used.

Video decoder 300 may then determine a set of available MTS schemes for the current block according to the mode group and the size of the current block (406). For example, video decoder 300 may determine the set of available MTS schemes according to Table 3 above. That is, the set of available MTS schemes may be one of a plurality of sets of available MTS schemes. Each of the sets (also referred to as "groups") may include four MTS schemes, as discussed above. There may be, for example, 80 different sets of MTS schemes, as shown in the example g_aucTrSet data structure above. Each of the sets of available MTS schemes may include a value representing an MTS scheme, such as an index into a set of 25 possible MTS schemes, e.g., as discussed above with respect to the g_aucTrIdxToTr data structure.

Video decoder 300 may further determine one of the MTS schemes of the determined set of MTS schemes (408) to be applied to the current block, that is, the transform block of the current block. For example, video decoder 300 may decode a transform index representing which of the four MTS schemes of the determined set of MTS schemes is to be applied for the current block.

Video decoder 300 may then apply the determined MTS scheme to the transform block for the current block (410). For example, video decoder 300 may apply a vertical transform and a horizontal transform of the MTS scheme to the transform block. Application of the MTS scheme may result in a reproduced residual block. Video decoder 300 may then decode the current block (412) using the residual block, e.g., by combining the residual block with a prediction block on a sample-by-sample basis.

In this manner, the method of FIG. 11 represents an example of a method of decoding video data including determining a size of a current block of video data; determining an intra-prediction mode for the current block of video data; determining a mode group including the determined intra-prediction mode, the mode group being one of a plurality of mode groups, each of the mode groups in the plurality of mode groups including respective sets of intra-prediction modes such that each possible intra-prediction mode is included in no more than one of the mode groups; determining a set of available multiple transform selection (MTS) schemes for the current block according to the size and the intra-prediction mode for the current block, the set of available MTS schemes being one set of available MTS schemes of a plurality of sets of MTS schemes; determining an MTS scheme from the set of available MTS schemes according to the determined mode group; applying transforms of the MTS scheme to a transform block of the current block to produce a residual block for the current block; and decoding the current block using the residual block.

Figure 12:
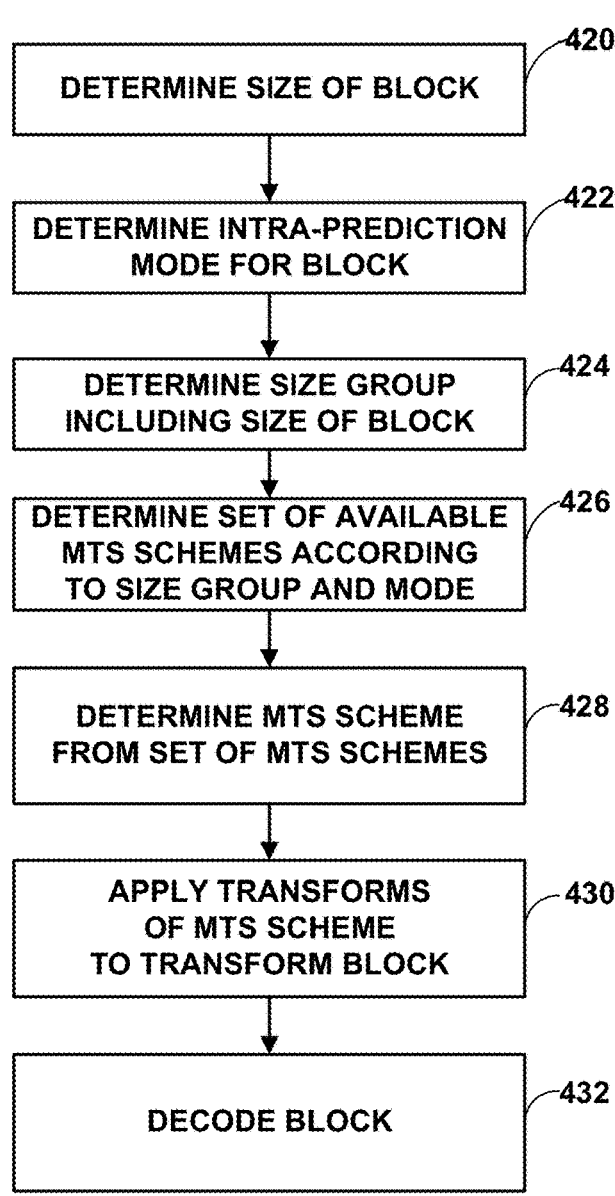
FIG. 12 is a flowchart illustrating another example method of decoding a block of video data according to techniques of this disclosure.

FIG. 12 is a flowchart illustrating an example method of decoding a block of video data according to techniques of this disclosure. The method of FIG. 12 may be performed by video decoder 300 (FIGS. 1 and 8), and is explained with respect to video decoder 300 for purposes of example. Video encoder 200 of FIGS. 1 and 7 and other video coding (encoding and/or decoding devices) may be configured to perform this or a similar method. The method of FIG. 12 may be performed as part of the method of FIG. 9 (e.g., steps 354 and/or 362) or as part of the method of FIG. 10 (e.g., step 378). The method of FIG. 12 may be performed along with the method of FIG. 11 in some examples.

Initially, video decoder 300 determines a size of a current block of video data (420). For example, video decoder 300 may determine a width W and a height H of the current block, where W and H represent a number of samples along the corresponding dimension of the current block. Video decoder 300 may also determine a current intra-prediction mode for the current block (422). For example, video decoder 300 may decode one or more intra-prediction mode syntax elements representing the intra-prediction mode for the current block. Alternatively, video decoder 300 may use any of the various techniques discussed above with respect to FIGS. 3-6 to determine the intra-prediction mode.

Video decoder 300 may then determine a size group including the determined intra-prediction mode (424). For example, video decoder 300 may determine the size group according to Table 1 as discussed above. In other examples, other size groupings, which may include more or fewer groups and/or more or fewer sizes in each group, may be used.

Video decoder 300 may then determine a set of available MTS schemes for the current block according to the size group and the intra-prediction mode for the current block (426). For example, video decoder 300 may determine the set of available MTS schemes according to Table 3 above. That is, the set of available MTS schemes may be one of a plurality of sets of available MTS schemes. Each of the sets (also referred to as "groups") may include four MTS schemes, as discussed above. There may be, for example, 80 different sets of MTS schemes, as shown in the example g_aucTrSet data structure above.

Video decoder 300 may further determine one of the MTS schemes of the determined set of MTS schemes (428) to be applied to the current block, that is, the transform block of the current block. For example, video decoder 300 may decode a transform index representing which of the four MTS schemes of the determined set of MTS schemes is to be applied for the current block.

Video decoder 300 may then apply the determined MTS scheme to the transform block for the current block (430). For example, video decoder 300 may apply a vertical transform and a horizontal transform of the MTS scheme to the transform block. Application of the MTS scheme may result in a reproduced residual block. Video decoder 300 may then decode the current block (432) using the residual block, e.g., by combining the residual block with a prediction block on a sample-by-sample basis.

Figure 13:
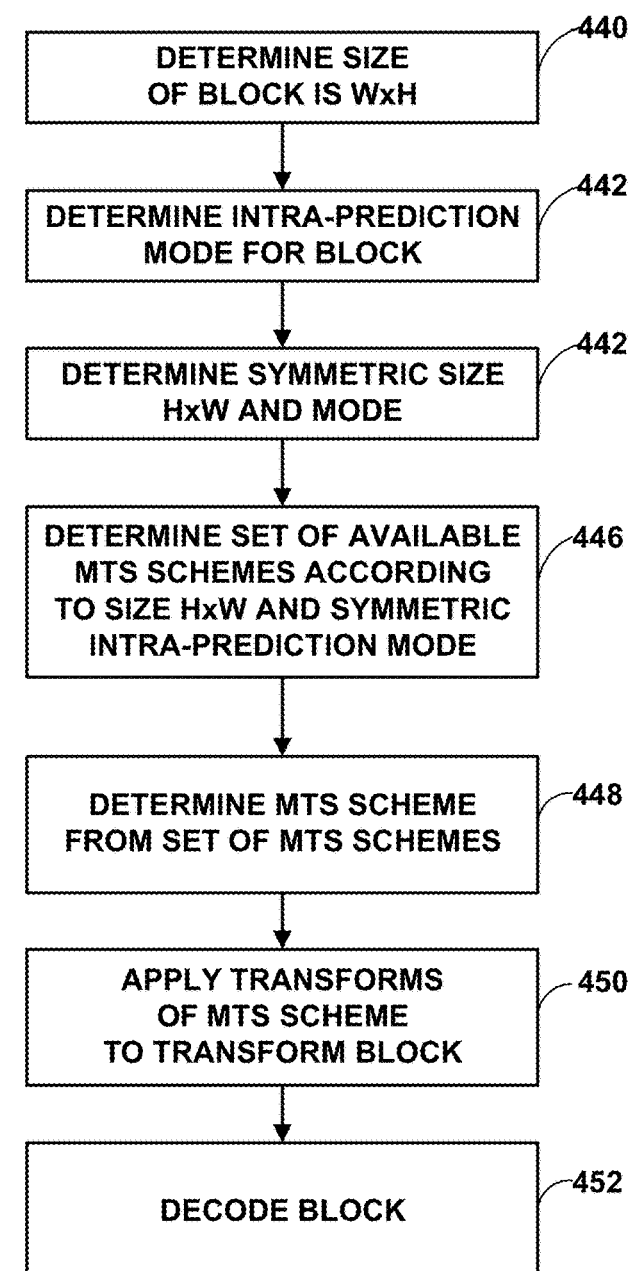
FIG. 13 is a flowchart illustrating another example method of decoding a block of video data according to techniques of this disclosure.

FIG. 13 is a flowchart illustrating an example method of decoding a block of video data according to techniques of this disclosure. The method of FIG. 13 may be performed by video decoder 300 (FIGS. 1 and 8), and is explained with respect to video decoder 300 for purposes of example. Video encoder 200 of FIGS. 1 and 7 and other video coding (encoding and/or decoding devices) may be configured to perform this or a similar method. The method of FIG. 13 may be performed as part of the method of FIG. 9 (e.g., steps 354 and/or 362) or as part of the method of FIG. 10 (e.g., step 378).

Initially, video decoder 300 determines a size W×H of a current block of video data (440). For example, video decoder 300 may determine the width W and the height H of the current block, where W and H represent a number of samples along the corresponding dimension of the current block. Video decoder 300 may also determine a current intra-prediction mode for the current block (442). For example, video decoder 300 may decode one or more intra-prediction mode syntax elements representing the intra-prediction mode for the current block. Alternatively, video decoder 300 may use any of the various techniques discussed above with respect to FIGS. 3-6 to determine the intra-prediction mode.

Video decoder 300 may then determine a symmetric size (H×W) and intra-prediction mode (444). In particular, if the actual size and intra-prediction mode of the current block are not included in Table 3, video decoder 300 may determine the MTS scheme using symmetric sizes and intra-prediction modes. By simply reversing W×H to H×W, video decoder 300 may obtain the symmetric block size. Symmetry of the intra-prediction modes may be determined according to a mirror image of modes 2 to 34 as shown in FIG. 2, assuming the mirror is parallel to mode 34 and crosses the top-left and bottom-right corners of the block in FIG. 2. Thus, for example, mode 66 is symmetric to mode 2, mode 65 is symmetric to mode 3, and so on, up to mode 33 being symmetric to mode 35 (and mode 34 would be symmetric to itself).

Video decoder 300 may then determine a set of available MTS schemes for the current block according to the symmetric block size (H×W) and the symmetric intra-prediction mode (446). For example, video decoder 300 may determine the set of available MTS schemes according to Table 3 above. That is, the set of available MTS schemes may be one of a plurality of sets of available MTS schemes. Each of the sets (also referred to as "groups") may include four MTS schemes, as discussed above. There may be, for example, 80 different sets of MTS schemes, as shown in the example g_aucTrSet data structure above. Each of the sets of available MTS schemes may include a value representing an MTS scheme, such as an index into a set of 25 possible MTS schemes, e.g., as discussed above with respect to the g_aucTrIdxToTr data structure. If, for example, the current block has a size of 8×32 and an intra-prediction mode of 58, video decoder 300 may determine that the symmetric size is 32×8, the symmetric intra-prediction mode is 10, and that the set of MTS schemes is the 66th entry of the g_aucTrSet data structure, per the example of Table 3.

Video decoder 300 may further determine one of the MTS schemes of the determined set of MTS schemes (448) to be applied to the current block, that is, the transform block of the current block. For example, video decoder 300 may decode a transform index representing which of the four MTS schemes of the determined set of MTS schemes is to be applied for the current block.

Video decoder 300 may then apply the determined MTS scheme to the transform block for the current block (450). For example, video decoder 300 may apply a vertical transform and a horizontal transform of the MTS scheme to the transform block. Application of the MTS scheme may result in a reproduced residual block. Video decoder 300 may then decode the current block (452) using the residual block, e.g., by combining the residual block with a prediction block on a sample-by-sample basis.

Various examples of the techniques of this disclosure are summarized in the following clauses:

Clause 1: A method of decoding video data, the method comprising: determining a size of a current block of video data; determining an intra-prediction mode for the current block of video data; determining a set of available multiple transform selection (MTS) schemes for the current block according to the size and the intra-prediction mode for the current block, the set of available MTS schemes being one set of available MTS schemes of a plurality of sets of MTS schemes; determining an MTS scheme from the set of available MTS schemes; applying transforms of the MTS scheme to a transform block of the current block to produce a residual block for the current block; and decoding the current block using the residual block.

Clause 2: The method of clause 1, wherein the size of the current block comprises a size group according to a width of the current block and a height of the current block.

Clause 3: The method of clause 2, wherein the size group of the current block is selected from one of a plurality of size groups including 4×4, 4×8, 4×16, 4×N, 8×4, 8×8, 8×16, 8×N, 16×4, 16×8, 16×16, 16×N, N×4, N×8, N×16, N×N, wherein N is an integer power of 2 and greater than 16.

Clause 4: The method of clause 3, wherein determining the set of available MTS schemes according to the size of the current block comprises determining the set of available MTS according to the size group for the current block.

Clause 5: The method of any of clauses 1-4, wherein determining the intra-prediction mode comprises determining a mode group including the intra-prediction mode, and wherein determining the set of available MTS schemes according to the intra-prediction mode for the current block comprises determining the set of available MTS according to the mode group for the current block.

Clause 6: The method of clause 5, wherein the mode group is selected from one of a plurality of mode groups including a first group including intra-prediction modes 0 and 1, a second group including intra-prediction modes 2 to 12, a third group including intra-prediction modes 13 to 23, a fourth group including intra-prediction modes 24 to 34, and a fifth group including matrix intra-prediction (MIP) mode.

Clause 7: The method of any of clauses 1-6, further comprising decoding an MTS index value representing the MTS scheme of the set of available MTS schemes, wherein determining the MTS scheme comprises determining the MTS scheme using the MTS index value.

Clause 8: The method of clause 7, wherein the MTS index value has a value between 0 and 3, inclusive, wherein the plurality of sets of MTS schemes comprises: {17, 18, 23, 24}, {3, 7, 18, 22}, {2, 17, 18, 22}, {3, 15, 17, 18}, {3, 12, 18, 19}, {12, 18, 19, 23}, {2, 12, 17, 18}, {2, 17, 18, 22}, {2, 11, 17, 18}, {12, 18, 19, 23}, {12, 13, 16, 24}, {2, 11, 16, 23}, {2, 13, 17, 22}, {2, 11, 17, 21}, {13, 16, 19, 22}, {7, 12, 13, 18}, {1, 11, 12, 16}, {3, 13, 17, 22}, {1, 6, 12, 22}, {12, 13, 15, 16}, {18, 19, 23, 24}, {2, 17, 18, 24}, {3, 4, 17, 22}, {12, 18, 19, 23}, {12, 18, 19, 23}, {6, 12, 18, 24}, {2, 6, 12, 21}, {1, 11, 17, 22}, {3, 11, 16, 17}, {8, 12, 19, 23}, {7, 13, 16, 23}, {1, 6, 11, 12}, {1, 11, 17, 21}, {6, 11, 17, 21}, {8, 11, 14, 17}, {6, 11, 12, 21}, {1, 6, 11, 12}, {2, 6, 11, 12}, {1, 6, 11, 21}, {7, 11, 12, 16}, {8, 12, 19, 24}, {1, 13, 18, 22}, {2, 6, 17, 21}, {11, 12, 16, 19}, {8, 12, 17, 24}, {6, 12, 19, 21}, {6, 12, 13, 21}, {2, 16, 17, 21}, {6, 17, 19, 23}, {6, 12, 14, 17}, {6, 7, 11, 21}, {1, 11, 12, 16}, {1, 6, 11, 12}, {6, 11, 12, 21}, {7, 8, 9, 11}, {6, 7, 11, 12}, {6, 7, 11, 12}, {1, 11, 12, 16}, {6, 11, 17, 21}, {6, 7, 11, 12}, {12, 14, 18, 21}, {1, 11, 16, 22}, {1, 11, 16, 22}, {7, 13, 15, 16}, {1, 8, 12, 19}, {6, 7, 9, 12}, {2, 6, 12, 13}, {1, 12, 16, 21}, {7, 11, 16, 19}, {7, 8, 11, 12}, {6, 7, 11, 12}, {6, 7, 11, 12}, {1, 6, 11, 12}, {6, 7, 11, 16}, {6, 7, 11, 12}, {6, 7, 11, 12}, {6, 11, 12, 21}, {1, 6, 11, 12}, {6, 7, 11, 12}, {6, 7, 11, 12}, and wherein the MTS index indicates a transform pair of the set of available MTS schemes according to: {DCT8, DCT8}, {DCT8, DST7}, {DCT8, DCT5}, {DCT8, DST4}, {DCT8, DST1}, {DST7, DCT8}, {DST7, DST7}, {DST7, DCT5}, {DST7, DST4}, {DST7, DST1}, {DCT5, DCT8}, {DCT5, DST7}, {DCT5, DCT5}, {DCT5, DST4}, {DCT5, DST1}, {DST4, DCT8}, {DST4, DST7}, {DST4, DCT5}, {DST4, DST4}, {DST4, DST1}, {DST1, DCT8}, {DST1, DST7}, {DST1, DCT5}, {DST1, DST4}, {DST1, DST1}.

Clause 9: The method of any of clauses 1-8, wherein each of the sets of MTS schemes includes four respective transform pair choices.

Clause 10: The method of any of clauses 1-9, further comprising determining a number of transform pair choices in the set of available MTS schemes according to a shape of the current block.

Clause 11: The method of any of clauses 1-10, further comprising determining a number of transform pair choices in the set of available MTS schemes according to a quantization parameter of the current block.

Clause 12: The method of any of clauses 1-11, wherein the current block comprises a first block, wherein the MTS scheme includes a transform pair including a horizontal transform and a vertical transform, wherein the first block has a size of W×H, wherein W is not equal to H, wherein the intra-prediction mode comprises I1 and is an angular intra-prediction mode, the method further comprising: determining that a second block has a size of H×W; determining that the second block has an intra-prediction mode of (68–I1); determining the set of available MTS schemes for the second block according to the size of H×W for the second block and the intra-prediction mode of (68–I1); determining the MTS scheme for the second block; applying the horizontal transform of the MTS scheme as a vertical transform to the second block; and applying the vertical transform of the MTS scheme as a horizontal transform to the second block.

Clause 13: The method of any of clauses 1-11, wherein the current block comprises a first block, wherein the MTS scheme includes a transform pair including a horizontal transform and a vertical transform, wherein the first block has a size of W×H, wherein W is not equal to H, wherein the intra-prediction mode comprises matrix intra-prediction (MIP) mode having a first transpose flag value, the method further comprising: determining that a second block has a size of H×W; determining that an intra-prediction mode for the second block is MIP intra-prediction mode with a second transpose flag value different than the first transpose flag value; determining the set of available MTS schemes for the second block according to the size of H×W for the second block and the MIP intra-prediction mode with the second transpose flag value; determining the MTS scheme for the second block from the set of available MTS schemes; applying the horizontal transform of the MTS scheme as a vertical transform to the second block; and applying the vertical transform of the MTS scheme as a horizontal transform to the second block.

Clause 14: The method of any of clauses 1-11, wherein when the current block is coded using decoder-side intra mode derivation and fused intra prediction (DIMD) mode, determining the set of available MTS schemes according to the intra-prediction mode comprises determining the set of available MTS schemes according to a dominant angular mode determined using the DIMD mode.

Clause 15: The method of clause 14, wherein the dominant angular mode comprises a mode having a highest weight.

Clause 16: The method of any of clauses 1-11, wherein when the current block is coded using decoder-side intra mode derivation and fused intra prediction (DIMD) mode, determining the set of available MTS schemes according to the intra-prediction mode comprises: determining whether a difference between two angular mode values is higher than a threshold; when the difference is higher than the threshold, determining the intra-prediction mode comprises determining the intra-prediction mode as being planar mode when determining the set of available MTS schemes; or when the difference is less than or equal to the threshold, determining the intra-prediction mode comprises determining the intra-prediction mode as being a dominant angular mode determined using the DIMD mode.

Clause 17: The method of any of clauses 1-11, wherein when the intra-prediction mode comprises a wide-angle intra-prediction mode, determining the set of available MTS schemes according to the intra-prediction mode comprises determining the set of available MTS schemes according to a conventional intra-prediction mode having an angle closest to an angle of the wide-angle intra-prediction mode.

Clause 18: The method of any of clauses 1-17, wherein determining the set of available MTS schemes according to the size and the intra-prediction mode for the current block comprises determining the set of available MTS schemes according to the following table:

| Size ‖ mode | [0, 1] | [2-12] | [13-23] | [24-34] | MIP |
|---|---|---|---|---|---|
| 4 × 4 | 0 | 1 | 2 | 3 | 4 |
| 4 × 8 | 5 | 6 | 7 | 8 | 9 |
| 4 × 16 | 10 | 11 | 12 | 13 | 14 |
| 4 × N | 15 | 16 | 17 | 18 | 19 |
| 8 × 4 | 20 | 21 | 22 | 23 | 24 |
| 8 × 8 | 25 | 26 | 27 | 28 | 29 |
| 8 × 16 | 30 | 31 | 32 | 33 | 34 |
| 8 × N | 35 | 36 | 37 | 38 | 39 |
| 16 × 4 | 40 | 41 | 42 | 43 | 44 |
| 16 × 8 | 45 | 46 | 47 | 48 | 49 |
| 16 × 16 | 50 | 51 | 52 | 53 | 54 |
| 16 × N | 55 | 56 | 57 | 58 | 59 |
| 32 × 4 | 60 | 61 | 62 | 63 | 64 |
| 32 × 8 | 65 | 66 | 67 | 68 | 69 |
| 32 × 16 | 70 | 71 | 72 | 73 | 74 |
| 32 × N | 75 | 76 | 77 | 78 | 79 | wherein N is an integer value equal to or greater than 32.

Clause 19: The method of any of clauses 1-18, wherein determining the intra-prediction mode comprises determining the intra-prediction mode according to template-based intra mode derivation (TIMD) mode.

Clause 20: The method of clause 19, wherein when the TIMD mode uses fusion of two intra-prediction modes, determining the set of available MTS schemes comprises determining the set of available MTS schemes according to a dominant intra-prediction mode of the two intra-prediction modes.

Clause 21: The method of clause 19, wherein when the TIMD mode uses fusion of two intra-prediction modes, determining the set of available MTS schemes comprises: when a difference between the two intra-prediction modes is higher than a threshold, determining the set of available MTS schemes comprises determining the set of available MTS schemes according to planar mode; or when the difference between the two intra-prediction modes is less than or equal to the threshold, determining the set of available MTS schemes comprises determining the set of available MTS schemes according to a dominant intra-prediction mode of the two intra-prediction modes.

Clause 22: The method of any of clauses 20 and 21, wherein the dominant intra-prediction mode comprises the intra-prediction mode of the two intra-prediction modes yielding a lower distortion.

Clause 23: The method of any of clauses 19-22, wherein determining the set of available MTS schemes comprises determining the set of available MTS schemes according to a table that maps extended intra-prediction mode angles to sets of available MTS schemes.

Clause 24: A method of decoding video data, the method comprising: determining a size of a current block of video data; determining an intra-prediction mode for the current block of video data; determining a mode group including the determined intra-prediction mode, the mode group being one of a plurality of mode groups, each of the mode groups in the plurality of mode groups including respective sets of intra-prediction modes such that each possible intra-prediction mode is included in no more than one of the mode groups; determining a set of available multiple transform selection (MTS) schemes for the current block according to the size and the intra-prediction mode for the current block, the set of available MTS schemes being one set of available MTS schemes of a plurality of sets of MTS schemes; determining an MTS scheme from the set of available MTS schemes according to the determined mode group; applying transforms of the MTS scheme to a transform block of the current block to produce a residual block for the current block; and decoding the current block using the residual block.

Clause 25: The method of clause 24, wherein the plurality of mode groups includes a first mode group including intra-prediction modes 0 and 1, a second group including intra-prediction modes 2 to 12, a third group including intra-prediction modes 13 to 23, a fourth group including intra-prediction modes 24 to 34, and a fifth group including matrix intra-prediction (MIP) mode.

Clause 26: The method of clause 24, wherein the size of the current block comprises a width of the current block and a height of the current block, and wherein the size of the current block is included in a size group.

Clause 27: The method of clause 26, wherein the size group of the current block is selected from one of a plurality of size groups including 4×4, 4×8, 4×16, 4×N, 8×4, 8×8, 8×16, 8×N, 16×4, 16×8, 16×16, 16×N, N×4, N×8, N×16, N×N, wherein N is an integer power of 2 and greater than 16.

Clause 28: The method of clause 27, wherein determining the set of available MTS schemes according to the size of the current block comprises determining the set of available MTS according to the size group for the current block.

Clause 29: The method of clause 24, further comprising decoding an MTS index value representing the MTS scheme of the set of available MTS schemes, wherein determining the MTS scheme comprises determining the MTS scheme using the MTS index value.

Clause 30: The method of clause 29, wherein the MTS index value has a value between 0 and 3, inclusive, wherein the plurality of sets of MTS schemes comprises: {17, 18, 23, 24}, {3, 7, 18, 22}, {2, 17, 18, 22}, {3, 15, 17, 18}, {3, 12, 18, 19}, {12, 18, 19, 23}, {2, 12, 17, 18}, {2, 17, 18, 22}, {2, 11, 17, 18}, {12, 18, 19, 23}, {12, 13, 16, 24}, {2, 11, 16, 23}, {2, 13, 17, 22}, {2, 11, 17, 21}, {13, 16, 19, 22}, {7, 12, 13, 18}, {1, 11, 12, 16}, {3, 13, 17, 22}, {1, 6, 12, 22}, {12, 13, 15, 16}, {18, 19, 23, 24}, {2, 17, 18, 24}, {3, 4, 17, 22}, {12, 18, 19, 23}, {12, 18, 19, 23}, {6, 12, 18, 24}, {2, 6, 12, 21}, {1, 11, 17, 22}, {3, 11, 16, 17}, {8, 12, 19, 23}, {7, 13, 16, 23}, {1, 6, 11, 12}, {1, 11, 17, 21}, {6, 11, 17, 21}, {8, 11, 14, 17}, {6, 11, 12, 21}, {1, 6, 11, 12}, {2, 6, 11, 12}, {1, 6, 11, 21}, {7, 11, 12, 16}, {8, 12, 19, 24}, {1, 13, 18, 22}, {2, 6, 17, 21}, {11, 12, 16, 19}, {8, 12, 17, 24}, {6, 12, 19, 21}, {6, 12, 13, 21}, {2, 16, 17, 21}, {6, 17, 19, 23}, {6, 12, 14, 17}, {6, 7, 11, 21}, {1, 11, 12, 16}, {1, 6, 11, 12}, {6, 11, 12, 21}, {7, 8, 9, 11}, {6, 7, 11, 12}, {6, 7, 11, 12}, {1, 11, 12, 16}, {6, 11, 17, 21}, {6, 7, 11, 12}, {12, 14, 18, 21}, {1, 11, 16, 22}, {1, 11, 16, 22}, {7, 13, 15, 16}, {1, 8, 12, 19}, {6, 7, 9, 12}, {2, 6, 12, 13}, {1, 12, 16, 21}, {7, 11, 16, 19}, {7, 8, 11, 12}, {6, 7, 11, 12}, {6, 7, 11, 12}, {1, 6, 11, 12}, {6, 7, 11, 16}, {6, 7, 11, 12}, {6, 7, 11, 12}, {6, 11, 12, 21}, {1, 6, 11, 12}, {6, 7, 11, 12}, {6, 7, 11, 12}, and wherein the MTS index indicates a transform pair of the set of available MTS schemes according to: {DCT8, DCT8}, {DCT8, DST7}, {DCT8, DCT5}, {DCT8, DST4}, {DCT8, DST1}, {DST7, DCT8}, {DST7, DST7}, {DST7, DCT5}, {DST7, DST4}, {DST7, DST1}, {DCT5, DCT8}, {DCT5, DST7}, {DCT5, DCT5}, {DCT5, DST4}, {DCT5, DST1}, {DST4, DCT8}, {DST4, DST7}, {DST4, DCT5}, {DST4, DST4}, {DST4, DST1}, {DST1, DCT8}, {DST1, DST7}, {DST1, DCT5}, {DST1, DST4}, {DST1, DST1}.

Clause 31: The method of clause 24, wherein each of the sets of MTS schemes includes four respective transform pair choices.

Clause 32: The method of clause 24, further comprising determining a number of transform pair choices in the set of available MTS schemes according to a shape of the current block.

Clause 33: The method of clause 24, further comprising determining a number of transform pair choices in the set of available MTS schemes according to a quantization parameter of the current block.

Clause 34: The method of clause 24, wherein the current block comprises a first block, wherein the MTS scheme includes a transform pair including a horizontal transform and a vertical transform, wherein the first block has a size of W×H, wherein W is not equal to H, wherein the intra-prediction mode comprises I1 and is an angular intra-prediction mode, the method further comprising: determining that a second block has a size of H×W; determining that the second block has an intra-prediction mode of (68–I1); determining the set of available MTS schemes for the second block according to the size of H×W for the second block and the intra-prediction mode of (68–I1); determining the MTS scheme for the second block; applying the horizontal transform of the MTS scheme as a vertical transform to the second block; and applying the vertical transform of the MTS scheme as a horizontal transform to the second block.

Clause 35: The method of clause 24, wherein the current block comprises a first block, wherein the MTS scheme includes a transform pair including a horizontal transform and a vertical transform, wherein the first block has a size of W×H, wherein W is not equal to H, wherein the intra-prediction mode comprises matrix intra-prediction (MIP) mode having a first transpose flag value, the method further comprising: determining that a second block has a size of H×W; determining that an intra-prediction mode for the second block is MIP intra-prediction mode with a second transpose flag value different than the first transpose flag value; determining the set of available MTS schemes for the second block according to the size of H×W for the second block and the MIP intra-prediction mode with the second transpose flag value; determining the MTS scheme for the second block from the set of available MTS schemes; applying the horizontal transform of the MTS scheme as a vertical transform to the second block; and applying the vertical transform of the MTS scheme as a horizontal transform to the second block.

Clause 36: The method of clause 24, wherein when the current block is coded using decoder-side intra mode derivation and fused intra prediction (DIMD) mode, determining the set of available MTS schemes according to the intra-prediction mode comprises determining the set of available MTS schemes according to a dominant angular mode determined using the DIMD mode.

Clause 37: The method of clause 36, wherein the dominant angular mode comprises a mode having a highest weight.

Clause 38: The method of clause 24, wherein when the current block is coded using decoder-side intra mode derivation and fused intra prediction (DIMD) mode, determining the set of available MTS schemes according to the intra-prediction mode comprises: determining whether a difference between two angular mode values is higher than a threshold; when the difference is higher than the threshold, determining the intra-prediction mode comprises determining the intra-prediction mode as being planar mode when determining the set of available MTS schemes; or when the difference is less than or equal to the threshold, determining the intra-prediction mode comprises determining the intra-prediction mode as being a dominant angular mode determined using the DIMD mode.

Clause 39: The method of clause 24, wherein when the intra-prediction mode comprises a wide-angle intra-prediction mode, determining the set of available MTS schemes according to the intra-prediction mode comprises determining the set of available MTS schemes according to a conventional intra-prediction mode having an angle closest to an angle of the wide-angle intra-prediction mode.

Clause 40: The method of clause 24, wherein determining the set of available MTS schemes according to the size and the intra-prediction mode for the current block comprises determining the set of available MTS schemes according to the following table:

| Size ‖ mode | [0, 1] | [2-12] | [13-23] | [24-34] | MIP |
|---|---|---|---|---|---|
| 4 × 4 | 0 | 1 | 2 | 3 | 4 |
| 4 × 8 | 5 | 6 | 7 | 8 | 9 |
| 4 × 16 | 10 | 11 | 12 | 13 | 14 |
| 4 × N | 15 | 16 | 17 | 18 | 19 |
| 8 × 4 | 20 | 21 | 22 | 23 | 24 |
| 8 × 8 | 25 | 26 | 27 | 28 | 29 |
| 8 × 16 | 30 | 31 | 32 | 33 | 34 |
| 8 × N | 35 | 36 | 37 | 38 | 39 |
| 16 × 4 | 40 | 41 | 42 | 43 | 44 |
| 16 × 8 | 45 | 46 | 47 | 48 | 49 |
| 16 × 16 | 50 | 51 | 52 | 53 | 54 |
| 16 × N | 55 | 56 | 57 | 58 | 59 |
| 32 × 4 | 60 | 61 | 62 | 63 | 64 |
| 32 × 8 | 65 | 66 | 67 | 68 | 69 |
| 32 × 16 | 70 | 71 | 72 | 73 | 74 |
| 32 × N | 75 | 76 | 77 | 78 | 79 | wherein N is an integer value equal to or greater than 32.

Clause 41: The method of clause 24, wherein determining the intra-prediction mode comprises determining the intra-prediction mode according to template-based intra mode derivation (TIMD) mode.

Clause 42: The method of clause 41, wherein when the TIMD mode uses fusion of two intra-prediction modes, determining the set of available MTS schemes comprises determining the set of available MTS schemes according to a dominant intra-prediction mode of the two intra-prediction modes.

Clause 43: The method of clause 41, wherein when the TIMD mode uses fusion of two intra-prediction modes, determining the set of available MTS schemes comprises: when a difference between the two intra-prediction modes is higher than a threshold, determining the set of available MTS schemes comprises determining the set of available MTS schemes according to planar mode; or when the difference between the two intra-prediction modes is less than or equal to the threshold, determining the set of available MTS schemes comprises determining the set of available MTS schemes according to a dominant intra-prediction mode of the two intra-prediction modes.

Clause 44: The method of clause 43, wherein the dominant intra-prediction mode comprises the intra-prediction mode of the two intra-prediction modes yielding a lower distortion.

Clause 45: The method of clause 43, wherein determining the set of available MTS schemes comprises determining the set of available MTS schemes according to a table that maps extended intra-prediction mode angles to sets of available MTS schemes.

Clause 46: The method of clause 24, wherein decoding the current block comprises: forming a prediction block for the current block using the intra-prediction mode; and adding samples of the prediction block to corresponding samples of the residual block.

Clause 47: The method of clause 24, further comprising encoding the current block prior to decoding the current block.

Clause 48: A device for decoding video data, the device comprising: a memory configured to store video data; and one or more processors implemented in circuitry and configured to: determine a size of a current block of video data; determine an intra-prediction mode for the current block of video data; determine a mode group including the determined intra-prediction mode, the mode group being one of a plurality of mode groups, each of the mode groups in the plurality of mode groups including respective sets of intra-prediction modes such that each possible intra-prediction mode is included in no more than one of the mode groups; determine a set of available multiple transform selection (MTS) schemes for the current block according to the size and the intra-prediction mode for the current block, the set of available MTS schemes being one set of available MTS schemes of a plurality of sets of MTS schemes; determine an MTS scheme from the set of available MTS schemes according to the determined mode group; apply transforms of the MTS scheme to a transform block of the current block to produce a residual block for the current block; and decode the current block using the residual block.

Clause 49: The device of clause 48, wherein the plurality of mode groups includes a first mode group including intra-prediction modes 0 and 1, a second group including intra-prediction modes 2 to 12, a third group including intra-prediction modes 13 to 23, a fourth group including intra-prediction modes 24 to 34, and a fifth group including matrix intra-prediction (MIP) mode.

Clause 50: The device of clause 48, wherein the size of the current block comprises a width of the current block and a height of the current block, and wherein the size of the current block is included in a size group.

Clause 51: The device of clause 48, wherein the one or more processors are further configured to decode an MTS index value representing the MTS scheme of the set of available MTS schemes, and wherein the one or more processors are configured to determine the MTS scheme using the MTS index value.

Clause 52: The device of clause 48, wherein the current block comprises a first block, wherein the MTS scheme includes a transform pair including a horizontal transform and a vertical transform, wherein the first block has a size of W×H, wherein W is not equal to H, wherein the intra-prediction mode comprises I1 and is an angular intra-prediction mode, and wherein the one or more processors are further configured to: determine that a second block has a size of H×W; determine that the second block has an intra-prediction mode of (68−I1); determine the set of available MTS schemes for the second block according to the size of H×W for the second block and the intra-prediction mode of (68−I1); determine the MTS scheme for the second block; apply the horizontal transform of the MTS scheme as a vertical transform to the second block; and apply the vertical transform of the MTS scheme as a horizontal transform to the second block.

Clause 53: The device of clause 48, wherein the current block comprises a first block, wherein the MTS scheme includes a transform pair including a horizontal transform and a vertical transform, wherein the first block has a size of W×H, wherein W is not equal to H, wherein the intra-prediction mode comprises matrix intra-prediction (MIP) mode having a first transpose flag value, and wherein the one or more processors are further configured to: determine that a second block has a size of H×W; determine that an intra-prediction mode for the second block is MIP intra-prediction mode with a second transpose flag value different than the first transpose flag value; determine the set of available MTS schemes for the second block according to the size of H×W for the second block and the MIP intra-prediction mode with the second transpose flag value; determine the MTS scheme for the second block from the set of available MTS schemes; apply the horizontal transform of the MTS scheme as a vertical transform to the second block; and apply the vertical transform of the MTS scheme as a horizontal transform to the second block.

Clause 54: The device of clause 48, wherein the one or more processors are further configured to encode the current block prior to decoding the current block.

Clause 55: The device of clause 48, further comprising a display configured to display the decoded video data.

Clause 56: The device of clause 48, wherein the device comprises one or more of a camera, a computer, a mobile device, a broadcast receiver device, or a set-top box.

Clause 57: A computer-readable storage medium having stored thereon instructions that, when executed, cause a processor of a device for decoding video data to: determine a size of a current block of video data; determine an intra-prediction mode for the current block of video data; determine a mode group including the determined intra-prediction mode, the mode group being one of a plurality of mode groups, each of the mode groups in the plurality of mode groups including respective sets of intra-prediction modes such that each possible intra-prediction mode is included in no more than one of the mode groups; determine a set of available multiple transform selection (MTS) schemes for the current block according to the size and the intra-prediction mode for the current block, the set of available MTS schemes being one set of available MTS schemes of a plurality of sets of MTS schemes; determine an MTS scheme from the set of available MTS schemes according to the determined mode group; apply transforms of the MTS scheme to a transform block of the current block to produce a residual block for the current block; and decode the current block using the residual block.

Clause 58: The computer-readable storage medium of clause 57, wherein the plurality of mode groups includes a first mode group including intra-prediction modes 0 and 1, a second group including intra-prediction modes 2 to 12, a third group including intra-prediction modes 13 to 23, a fourth group including intra-prediction modes 24 to 34, and a fifth group including matrix intra-prediction (MIP) mode.

Clause 59: The computer-readable storage medium of clause 57, wherein the size of the current block comprises a width of the current block and a height of the current block, and wherein the size of the current block is included in a size group.

Clause 60: The computer-readable storage medium of clause 57, further comprising instructions that cause the processor to decode an MTS index value representing the MTS scheme of the set of available MTS schemes, and wherein the instructions that cause the processor to determine the MTS scheme comprise instructions that cause the processor to determine the MTS scheme using the MTS index value.

Clause 61: The device of clause 48, wherein the current block comprises a first block, wherein the MTS scheme includes a transform pair including a horizontal transform and a vertical transform, wherein the first block has a size of W×H, wherein W is not equal to H, wherein the intra-prediction mode comprises I1 and is an angular intra-prediction mode, further comprising instructions that cause the processor to: determine that a second block has a size of H×W; determine that the second block has an intra-prediction mode of (68−I1); determine the set of available MTS schemes for the second block according to the size of H×W for the second block and the intra-prediction mode of (68−I1); determine the MTS scheme for the second block; apply the horizontal transform of the MTS scheme as a vertical transform to the second block; and apply the vertical transform of the MTS scheme as a horizontal transform to the second block.

Clause 62: The device of clause 48, wherein the current block comprises a first block, wherein the MTS scheme includes a transform pair including a horizontal transform and a vertical transform, wherein the first block has a size of W×H, wherein W is not equal to H, wherein the intra-prediction mode comprises matrix intra-prediction (MIP) mode having a first transpose flag value, further comprising instructions that cause the processor to: determine that a second block has a size of H×W; determine that an intra-prediction mode for the second block is MIP intra-prediction mode with a second transpose flag value different than the first transpose flag value; determine the set of available MTS schemes for the second block according to the size of H×W for the second block and the MIP intra-prediction mode with the second transpose flag value; determine the MTS scheme for the second block from the set of available MTS schemes; apply the horizontal transform of the MTS scheme as a vertical transform to the second block; and apply the vertical transform of the MTS scheme as a horizontal transform to the second block.

Clause 63: The device of clause 48, further comprising instructions that cause the processor to encode the current block prior to decoding the current block.

Clause 64: A device for decoding video data, the device comprising: means for determining a size of a current block of video data; means for determining an intra-prediction mode for the current block of video data; means for determining a mode group including the determined intra-prediction mode, the mode group being one of a plurality of mode groups, each of the mode groups in the plurality of mode groups including respective sets of intra-prediction modes such that each possible intra-prediction mode is included in no more than one of the mode groups; means for determining a set of available multiple transform selection (MTS) schemes for the current block according to the size and the intra-prediction mode for the current block, the set of available MTS schemes being one set of available MTS schemes of a plurality of sets of MTS schemes; means for determining an MTS scheme from the set of available MTS schemes according to the determined mode group; means for applying transforms of the MTS scheme to a transform block of the current block to produce a residual block for the current block; and means for decoding the current block using the residual block.

Clause 65: A method of decoding video data, the method comprising: determining a size of a current block of video data; determining an intra-prediction mode for the current block of video data; determining a mode group including the determined intra-prediction mode, the mode group being one of a plurality of mode groups, each of the mode groups in the plurality of mode groups including respective sets of intra-prediction modes such that each possible intra-prediction mode is included in no more than one of the mode groups; determining a set of available multiple transform selection (MTS) schemes for the current block according to the size and the intra-prediction mode for the current block, the set of available MTS schemes being one set of available MTS schemes of a plurality of sets of MTS schemes; determining an MTS scheme from the set of available MTS schemes according to the determined mode group; applying transforms of the MTS scheme to a transform block of the current block to produce a residual block for the current block; and decoding the current block using the residual block.

Clause 66: The method of clause 65, wherein the plurality of mode groups includes a first mode group including intra-prediction modes 0 and 1, a second group including intra-prediction modes 2 to 12, a third group including intra-prediction modes 13 to 23, a fourth group including intra-prediction modes 24 to 34, and a fifth group including matrix intra-prediction (MIP) mode.

Clause 67: The method of any of clauses 65 and 66, wherein the size of the current block comprises a width of the current block and a height of the current block, and wherein the size of the current block is included in a size group.

Clause 68: The method of clause 67, wherein the size group of the current block is selected from one of a plurality of size groups including 4×4, 4×8, 4×16, 4×N, 8×4, 8×8, 8×16, 8×N, 16×4, 16×8, 16×16, 16×N, N×4, N×8, N×16, N×N, wherein N is an integer power of 2 and greater than 16.

Clause 69: The method of clause 68, wherein determining the set of available MTS schemes according to the size of the current block comprises determining the set of available MTS according to the size group for the current block.

Clause 70: The method of any of clauses 65-69, further comprising decoding an MTS index value representing the MTS scheme of the set of available MTS schemes, wherein determining the MTS scheme comprises determining the MTS scheme using the MTS index value.

Clause 71: The method of clause 70, wherein the MTS index value has a value between 0 and 3, inclusive, wherein the plurality of sets of MTS schemes comprises: {17, 18, 23, 24}, {3, 7, 18, 22}, {2, 17, 18, 22}, {3, 15, 17, 18}, {3, 12, 18, 19}, {12, 18, 19, 23}, {2, 12, 17, 18}, {2, 17, 18, 22}, {2, 11, 17, 18}, {12, 18, 19, 23}, {12, 13, 16, 24}, {2, 11, 16, 23}, {2, 13, 17, 22}, {2, 11, 17, 21}, {13, 16, 19, 22}, {7, 12, 13, 18}, {1, 11, 12, 16}, {3, 13, 17, 22}, {1, 6, 12, 22}, {12, 13, 15, 16}, {18, 19, 23, 24}, {2, 17, 18, 24}, {3, 4, 17, 22}, {12, 18, 19, 23}, {12, 18, 19, 23}, {6, 12, 18, 24}, {2, 6, 12, 21}, {1, 11, 17, 22}, {3, 11, 16, 17}, {8, 12, 19, 23}, {7, 13, 16, 23}, {1, 6, 11, 12}, {1, 11, 17, 21}, {6, 11, 17, 21}, {8, 11, 14, 17}, {6, 11, 12, 21}, {1, 6, 11, 12}, {2, 6, 11, 12}, {1, 6, 11, 21}, {7, 11, 12, 16}, {8, 12, 19, 24}, {1, 13, 18, 22}, {2, 6, 17, 21}, {11, 12, 16, 19}, {8, 12, 17, 24}, {6, 12, 19, 21}, {6, 12, 13, 21}, {2, 16, 17, 21}, {6, 17, 19, 23}, {6, 12, 14, 17}, {6, 7, 11, 21}, {1, 11, 12, 16}, {1, 6, 11, 12}, {6, 11, 12, 21}, {7, 8, 9, 11}, {6, 7, 11, 12}, {6, 7, 11, 12}, {1, 11, 12, 16}, {6, 11, 17, 21}, {6, 7, 11, 12}, {12, 14, 18, 21}, {1, 11, 16, 22}, {1, 11, 16, 22}, {7, 13, 15, 16}, {1, 8, 12, 19}, {6, 7, 9, 12}, {2, 6, 12, 13}, {1, 12, 16, 21}, {7, 11, 16, 19}, {7, 8, 11, 12}, {6, 7, 11, 12}, {6, 7, 11, 12}, {1, 6, 11, 12}, {6, 7, 11, 16}, {6, 7, 11, 12}, {6, 7, 11, 12}, {6, 11, 12, 21}, {1, 6, 11, 12}, {6, 7, 11, 12}, {6, 7, 11, 12}, and wherein the MTS index indicates a transform pair of the set of available MTS schemes according to: {DCT8, DCT8}, {DCT8, DST7}, {DCT8, DCT5}, {DCT8, DST4}, {DCT8, DST1}, {DST7, DCT8}, {DST7, DST7}, {DST7, DCT5}, {DST7, DST4}, {DST7, DST1}, {DCT5, DCT8}, {DCT5, DST7}, {DCT5, DCT5}, {DCT5, DST4}, {DCT5, DST1}, {DST4, DCT8}, {DST4, DST7}, {DST4, DCT5}, {DST4, DST4}, {DST4, DST1}, {DST1, DCT8}, {DST1, DST7}, {DST1, DCT5}, {DST1, DST4}, {DST1, DST1}.

Clause 72: The method of any of clauses 65-71, wherein each of the sets of MTS schemes includes four respective transform pair choices.

Clause 73: The method of any of clauses 65-72, further comprising determining a number of transform pair choices in the set of available MTS schemes according to a shape of the current block.

Clause 74: The method of any of clauses 65-73, further comprising determining a number of transform pair choices in the set of available MTS schemes according to a quantization parameter of the current block.

Clause 75: The method of any of clauses 65-74, wherein the current block comprises a first block, wherein the MTS scheme includes a transform pair including a horizontal transform and a vertical transform, wherein the first block has a size of W×H, wherein W is not equal to H, wherein the intra-prediction mode comprises I1 and is an angular intra-prediction mode, the method further comprising: determining that a second block has a size of H×W; determining that the second block has an intra-prediction mode of (68−I1); determining the set of available MTS schemes for the second block according to the size of H×W for the second block and the intra-prediction mode of (68−I1); determining the MTS scheme for the second block; applying the horizontal transform of the MTS scheme as a vertical transform to the second block; and applying the vertical transform of the MTS scheme as a horizontal transform to the second block.

Clause 76: The method of any of clauses 65-74, wherein the current block comprises a first block, wherein the MTS scheme includes a transform pair including a horizontal transform and a vertical transform, wherein the first block has a size of W×H, wherein W is not equal to H, wherein the intra-prediction mode comprises matrix intra-prediction (MIP) mode having a first transpose flag value, the method further comprising: determining that a second block has a size of H×W; determining that an intra-prediction mode for the second block is MIP intra-prediction mode with a second transpose flag value different than the first transpose flag value; determining the set of available MTS schemes for the second block according to the size of H×W for the second block and the MIP intra-prediction mode with the second transpose flag value; determining the MTS scheme for the second block from the set of available MTS schemes; applying the horizontal transform of the MTS scheme as a vertical transform to the second block; and applying the vertical transform of the MTS scheme as a horizontal transform to the second block.

Clause 77: The method of any of clauses 65-76, wherein when the current block is coded using decoder-side intra mode derivation and fused intra prediction (DIMD) mode, determining the set of available MTS schemes according to the intra-prediction mode comprises determining the set of available MTS schemes according to a dominant angular mode determined using the DIMD mode.

Clause 78: The method of clause 77, wherein the dominant angular mode comprises a mode having a highest weight.

Clause 79: The method of any of clauses 65-78, wherein when the current block is coded using decoder-side intra mode derivation and fused intra prediction (DIMD) mode, determining the set of available MTS schemes according to the intra-prediction mode comprises: determining whether a difference between two angular mode values is higher than a threshold; when the difference is higher than the threshold, determining the intra-prediction mode comprises determining the intra-prediction mode as being planar mode when determining the set of available MTS schemes; or when the difference is less than or equal to the threshold, determining the intra-prediction mode comprises determining the intra-prediction mode as being a dominant angular mode determined using the DIMD mode.

Clause 80: The method of any of clauses 65-79, wherein when the intra-prediction mode comprises a wide-angle intra-prediction mode, determining the set of available MTS schemes according to the intra-prediction mode comprises determining the set of available MTS schemes according to a conventional intra-prediction mode having an angle closest to an angle of the wide-angle intra-prediction mode.

Clause 81: The method of any of clauses 65-80, wherein determining the set of available MTS schemes according to the size and the intra-prediction mode for the current block comprises determining the set of available MTS schemes according to the following table:

| Size ‖ mode | [0, 1] | [2-12] | [13-23] | [24-34] | MIP |
|---|---|---|---|---|---|
| 4 × 4 | 0 | 1 | 2 | 3 | 4 |
| 4 × 8 | 5 | 6 | 7 | 8 | 9 |
| 4 × 16 | 10 | 11 | 12 | 13 | 14 |
| 4 × N | 15 | 16 | 17 | 18 | 19 |
| 8 × 4 | 20 | 21 | 22 | 23 | 24 |
| 8 × 8 | 25 | 26 | 27 | 28 | 29 |
| 8 × 16 | 30 | 31 | 32 | 33 | 34 |
| 8 × N | 35 | 36 | 37 | 38 | 39 |
| 16 × 4 | 40 | 41 | 42 | 43 | 44 |
| 16 × 8 | 45 | 46 | 47 | 48 | 49 |
| 16 × 16 | 50 | 51 | 52 | 53 | 54 |
| 16 × N | 55 | 56 | 57 | 58 | 59 |
| 32 × 4 | 60 | 61 | 62 | 63 | 64 |
| 32 × 8 | 65 | 66 | 67 | 68 | 69 |
| 32 × 16 | 70 | 71 | 72 | 73 | 74 |
| 32 × N | 75 | 76 | 77 | 78 | 79 | wherein N is an integer value equal to or greater than 32.

Clause 82: The method of any of clauses 65-81, wherein determining the intra-prediction mode comprises determining the intra-prediction mode according to template-based intra mode derivation (TIMD) mode.

Clause 83: The method of clause 82, wherein when the TIMD mode uses fusion of two intra-prediction modes, determining the set of available MTS schemes comprises determining the set of available MTS schemes according to a dominant intra-prediction mode of the two intra-prediction modes.

Clause 84: The method of clause 82, wherein when the TIMD mode uses fusion of two intra-prediction modes, determining the set of available MTS schemes comprises: when a difference between the two intra-prediction modes is higher than a threshold, determining the set of available MTS schemes comprises determining the set of available MTS schemes according to planar mode; or when the difference between the two intra-prediction modes is less than or equal to the threshold, determining the set of available MTS schemes comprises determining the set of available MTS schemes according to a dominant intra-prediction mode of the two intra-prediction modes.

Clause 85: The method of clause 84, wherein the dominant intra-prediction mode comprises the intra-prediction mode of the two intra-prediction modes yielding a lower distortion.

Clause 86: The method of any of clauses 84 and 85, wherein determining the set of available MTS schemes comprises determining the set of available MTS schemes according to a table that maps extended intra-prediction mode angles to sets of available MTS schemes.

Clause 87: The method of any of clauses 65-86, wherein decoding the current block comprises: forming a prediction block for the current block using the intra-prediction mode; and adding samples of the prediction block to corresponding samples of the residual block.

Clause 88: The method of any of clauses 65-87, further comprising encoding the current block prior to decoding the current block.

Clause 89: A device for decoding video data, the device comprising: a memory configured to store video data; and one or more processors implemented in circuitry and configured to: determine a size of a current block of video data; determine an intra-prediction mode for the current block of video data; determine a mode group including the determined intra-prediction mode, the mode group being one of a plurality of mode groups, each of the mode groups in the plurality of mode groups including respective sets of intra-prediction modes such that each possible intra-prediction mode is included in no more than one of the mode groups; determine a set of available multiple transform selection (MTS) schemes for the current block according to the size and the intra-prediction mode for the current block, the set of available MTS schemes being one set of available MTS schemes of a plurality of sets of MTS schemes; determine an MTS scheme from the set of available MTS schemes according to the determined mode group; apply transforms of the MTS scheme to a transform block of the current block to produce a residual block for the current block; and decode the current block using the residual block.

Clause 90: The device of clause 89, wherein the plurality of mode groups includes a first mode group including intra-prediction modes 0 and 1, a second group including intra-prediction modes 2 to 12, a third group including intra-prediction modes 13 to 23, a fourth group including intra-prediction modes 24 to 34, and a fifth group including matrix intra-prediction (MIP) mode.

Clause 91: The device of any of clauses 89 and 90, wherein the size of the current block comprises a width of the current block and a height of the current block, and wherein the size of the current block is included in a size group.

Clause 92: The device of any of clauses 89-91, wherein the one or more processors are further configured to decode an MTS index value representing the MTS scheme of the set of available MTS schemes, and wherein the one or more processors are configured to determine the MTS scheme using the MTS index value.

Clause 93: The device of any of clauses 89-92, wherein the current block comprises a first block, wherein the MTS scheme includes a transform pair including a horizontal transform and a vertical transform, wherein the first block has a size of W×H, wherein W is not equal to H, wherein the intra-prediction mode comprises $I_1$ and is an angular intra-prediction mode, and wherein the one or more processors are further configured to: determine that a second block has a size of H×W; determine that the second block has an intra-prediction mode of $(68-I_1)$; determine the set of available MTS schemes for the second block according to the size of H×W for the second block and the intra-prediction mode of $(68-I_1)$; determine the MTS scheme for the second block; apply the horizontal transform of the MTS scheme as a vertical transform to the second block; and apply the vertical transform of the MTS scheme as a horizontal transform to the second block.

Clause 94: The device of any of clauses 89-93, wherein the current block comprises a first block, wherein the MTS scheme includes a transform pair including a horizontal transform and a vertical transform, wherein the first block has a size of W×H, wherein W is not equal to H, wherein the intra-prediction mode comprises matrix intra-prediction (MIP) mode having a first transpose flag value, and wherein the one or more processors are further configured to: determine that a second block has a size of H×W; determine that an intra-prediction mode for the second block is MIP intra-prediction mode with a second transpose flag value different than the first transpose flag value; determine the set of available MTS schemes for the second block according to the size of H×W for the second block and the MIP intra-prediction mode with the second transpose flag value; determine the MTS scheme for the second block from the set of available MTS schemes; apply the horizontal transform of the MTS scheme as a vertical transform to the second block; and apply the vertical transform of the MTS scheme as a horizontal transform to the second block.

Clause 95: The device of any of clauses 89-94, wherein the one or more processors are further configured to encode the current block prior to decoding the current block.

Clause 96: The device of any of clauses 89-95, further comprising a display configured to display the decoded video data.

Clause 97: The device of any of clauses 89-96, wherein the device comprises one or more of a camera, a computer, a mobile device, a broadcast receiver device, or a set-top box.

Clause 98: A computer-readable storage medium having stored thereon instructions that, when executed, cause a processor of a device for decoding video data to: determine a size of a current block of video data; determine an intra-prediction mode for the current block of video data; determine a mode group including the determined intra-prediction mode, the mode group being one of a plurality of mode groups, each of the mode groups in the plurality of mode groups including respective sets of intra-prediction modes such that each possible intra-prediction mode is included in no more than one of the mode groups; determine a set of available multiple transform selection (MTS) schemes for the current block according to the size and the intra-prediction mode for the current block, the set of available MTS schemes being one set of available MTS schemes of a plurality of sets of MTS schemes; determine an MTS scheme from the set of available MTS schemes according to the determined mode group; apply transforms of the MTS scheme to a transform block of the current block to produce a residual block for the current block; and decode the current block using the residual block.

Clause 99: The computer-readable storage medium of clause 98, wherein the plurality of mode groups includes a first mode group including intra-prediction modes 0 and 1, a second group including intra-prediction modes 2 to 12, a third group including intra-prediction modes 13 to 23, a fourth group including intra-prediction modes 24 to 34, and a fifth group including matrix intra-prediction (MIP) mode.

Clause 100: The computer-readable storage medium of any of clauses 98 and 99, wherein the size of the current block comprises a width of the current block and a height of the current block, and wherein the size of the current block is included in a size group.

Clause 101: The computer-readable storage medium of any of clauses 98-100, further comprising instructions that cause the processor to decode an MTS index value representing the MTS scheme of the set of available MTS schemes, and wherein the instructions that cause the processor to determine the MTS scheme comprise instructions that cause the processor to determine the MTS scheme using the MTS index value.

Clause 102: The device of any of clauses 98-101, wherein the current block comprises a first block, wherein the MTS scheme includes a transform pair including a horizontal transform and a vertical transform, wherein the first block has a size of W×H, wherein W is not equal to H, wherein the intra-prediction mode comprises $I_1$ and is an angular intra-prediction mode, further comprising instructions that cause the processor to: determine that a second block has a size of H×W; determine that the second block has an intra-prediction mode of $(68-I_1)$; determine the set of available MTS schemes for the second block according to the size of H×W for the second block and the intra-prediction mode of $(68-I_1)$; determine the MTS scheme for the second block; apply the horizontal transform of the MTS scheme as a vertical transform to the second block; and apply the vertical transform of the MTS scheme as a horizontal transform to the second block.

Clause 103: The device of any of clauses 98-102, wherein the current block comprises a first block, wherein the MTS scheme includes a transform pair including a horizontal transform and a vertical transform, wherein the first block has a size of W×H, wherein W is not equal to H, wherein the intra-prediction mode comprises matrix intra-prediction (MIP) mode having a first transpose flag value, further comprising instructions that cause the processor to: determine that a second block has a size of H×W; determine that an intra-prediction mode for the second block is MIP intra-prediction mode with a second transpose flag value different than the first transpose flag value; determine the set of available MTS schemes for the second block according to the size of H×W for the second block and the MIP intra-prediction mode with the second transpose flag value; determine the MTS scheme for the second block from the set of available MTS schemes; apply the horizontal transform of the MTS scheme as a vertical transform to the second block; and apply the vertical transform of the MTS scheme as a horizontal transform to the second block.

Clause 104: The device of any of clauses 98-103, further comprising instructions that cause the processor to encode the current block prior to decoding the current block.

Clause 105: A device for decoding video data, the device comprising: means for determining a size of a current block of video data; means for determining an intra-prediction mode for the current block of video data; means for determining a mode group including the determined intra-prediction mode, the mode group being one of a plurality of mode groups, each of the mode groups in the plurality of mode groups including respective sets of intra-prediction modes such that each possible intra-prediction mode is included in no more than one of the mode groups; means for determining a set of available multiple transform selection (MTS) schemes for the current block according to the size and the intra-prediction mode for the current block, the set of available MTS schemes being one set of available MTS schemes of a plurality of sets of MTS schemes; means for determining an MTS scheme from the set of available MTS schemes according to the determined mode group; means for applying transforms of the MTS scheme to a transform block of the current block to produce a residual block for the current block; and means for decoding the current block using the residual block.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:

determining a size of a current block of video data;

determining an intra-prediction mode for the current block of video data, wherein the determined intra-prediction mode comprises a matrix intra-prediction (MIP) mode having a transpose flag value;

determining a mode group including the determined intra-prediction mode, the mode group being one of a plurality of mode groups, each of the mode groups in the plurality of mode groups including respective sets of intra-prediction modes such that each possible intra-prediction mode is included in no more than one of the mode groups;

determining a set of available multiple transform selection (MTS) schemes for the current block according to the size and the MIP intra-prediction mode for the current block, the set of available MTS schemes being one set of available MTS schemes of a plurality of sets of MTS schemes, each of the sets of MTS schemes of the plurality of sets of MTS schemes including a common number of MTS schemes, the common number being greater than one;

determining an MTS scheme from the set of available MTS schemes according to the determined mode group, wherein each of the MTS schemes of the plurality of sets of MTS schemes includes a respective transform pair including a respective horizontal transform and a respective vertical transform, wherein the current block has a size of W×H, wherein W is not equal to H;

applying transforms of the MTS scheme to a transform block of the current block to produce a residual block for the current block, comprising:

based on the transpose flag value being a first value: applying the respective horizontal transform of the MTS scheme and the respective vertical transform of the MTS scheme to the transform block; or based on the transpose flag value being a second value, different from the first value:

transposing the respective horizontal transform of the MTS scheme to form a transposed vertical transform;

transposing the respective vertical transform of the MTS scheme to form a transposed horizontal transform; and applying the transposed horizontal transform and the transposed vertical transform to the transform block; and decoding the current block using the residual block.

2. The method of claim 1, wherein the plurality of mode groups includes a first mode group including intra-prediction modes 0 and 1, a second group including intra-prediction modes 2 to 12, a third group including intra-prediction modes 13 to 23, a fourth group including intra-prediction modes 24 to 34, and a fifth group including matrix intra-prediction (MIP) mode.

3. The method of claim 1, wherein the size of the current block comprises a width of the current block and a height of the current block, and wherein the size of the current block is included in a size group.

4. The method of claim 3, wherein the size group of the current block is selected from one of a plurality of size groups including 4×4, 4×8, 4×16, 4×N, 8×4, 8×8, 8×16, 8×N, 16×4, 16×8, 16×16, 16×N, N×4, N×8, N×16, N×N, wherein N is an integer power of 2 and greater than 16.

5. The method of claim 4, wherein determining the set of available MTS schemes according to the size of the current block comprises determining the set of available MTS according to the size group for the current block.

6. The method of claim 1, further comprising decoding an MTS index value representing the MTS scheme of the set of available MTS schemes, wherein determining the MTS scheme comprises determining the MTS scheme using the MTS index value.

7. The method of claim 6, wherein the MTS index value has a value between 0 and 3, inclusive, wherein the plurality of sets of MTS schemes comprises:

{17, 18, 23, 24},
{3, 7, 18, 22},
{2, 17, 18, 22},
{3, 15, 17, 18},
{3, 12, 18, 19},
{12, 18, 19, 23},
{2, 12, 17, 18},
{2, 17, 18, 22},
{2, 11, 17, 18},
{12, 18, 19, 23},
{12, 13, 16, 24},
{2, 11, 16, 23},
{2, 13, 17, 22},
{2, 11, 17, 21},
{13, 16, 19, 22},
{7, 12, 13, 18},
{1, 11, 12, 16},
{3, 13, 17, 22},
{1, 6, 12, 22},
{12, 13, 15, 16},
{18, 19, 23, 24},
{2, 17, 18, 24},
{3, 4, 17, 22},
{12, 18, 19, 23},
{12, 18, 19, 23},
{6, 12, 18, 24},
{2, 6, 12, 21},
{1, 11, 17, 22},
{3, 11, 16, 17},
{8, 12, 19, 23},
{7, 13, 16, 23},
{1, 6, 11, 12},
{1, 11, 17, 21},
{6, 11, 17, 21},
{8, 11, 14, 17},
{6, 11, 12, 21},
{1, 6, 11, 12},
{2, 6, 11, 12},
{1, 6, 11, 21},
{7, 11, 12, 16},
{8, 12, 19, 24},
{1, 13, 18, 22},
{2, 6, 17, 21},
{11, 12, 16, 19},
{8, 12, 17, 24},
{6, 12, 19, 21},
{6, 12, 13, 21},

-continued

```
                                {2, 16, 17, 21},
                                {6, 17, 19, 23},
                                {6, 12, 14, 17},
                                {6, 7, 11, 21},
                                {1, 11, 12, 16},
                                {1, 6, 11, 12},
                                {6, 11, 12, 21},
                                {7, 8, 9, 11},
                                {6, 7, 11, 12},
                                {6, 7, 11, 12},
                                {1, 11, 12, 16},
                                {6, 11, 17, 21},
                                {6, 7, 11, 12},
                                {12, 14, 18, 21},
                                {1, 11, 16, 22},
                                {1, 11, 16, 22},
                                {7, 13, 15, 16},
                                {1, 8, 12, 19},
                                {6, 7, 9, 12},
                                {2, 6, 12, 13},
                                {1, 12, 16, 21},
                                {7, 11, 16, 19},
                                {7, 8, 11, 12},
                                {6, 7, 11, 12},
                                {6, 7, 11, 12},
                                {1, 6, 11, 12},
                                {6, 7, 11, 16},
                                {6, 7, 11, 12},
                                {6, 7, 11, 12},
                                {6, 11, 12, 21},
                                {1, 6, 11, 12},
                                {6, 7, 11, 12},
                                {6, 7, 11, 12},
``` and wherein the MTS index indicates a transform pair of the set of available MTS schemes according to:

```
{DCT8, DCT8}, {DCT8, DST7}, {DCT8, DCT5}, {DCT8, DST4}, {DCT8, DST1},
{DST7, DCT8}, {DST7, DST7}, {DST7, DCT5}, {DST7, DST4}, {DST7, DST1},
{DCT5, DCT8}, {DCT5, DST7}, {DCT5, DCT5}, {DCT5, DST4}, {DCT5, DST1},
{DST4, DCT8}, {DST4, DST7}, {DST4, DCT5}, {DST4, DST4}, {DST4, DST1},
{DST1, DCT8}, {DST1, DST7}, {DST1, DCT5}, {DST1, DST4}, {DST1, DST1}.
```

8. The method of claim 1, wherein the common number of MTS schemes of each of the sets of MTS schemes is four.

9. The method of claim 1, wherein decoding the current block comprises:

forming a prediction block for the current block using the intra-prediction mode; and adding samples of the prediction block to corresponding samples of the residual block.

10. The method of claim 1, further comprising encoding the current block prior to decoding the current block.

11. A device for decoding video data, the device comprising:

a memory configured to store video data; and one or more processors implemented in circuitry and configured to:

determine a size of a current block of video data;

determine an intra-prediction mode for the current block of video data, wherein the determined intra-prediction mode comprises a matrix intra-prediction (MIP) mode having a transpose flag value;

determine a mode group including the determined intra-prediction mode, the mode group being one of a plurality of mode groups, each of the mode groups in the plurality of mode groups including respective sets of intra-prediction modes such that each possible intra-prediction mode is included in no more than one of the mode groups;

determine a set of available multiple transform selection (MTS) schemes for the current block according to the size and the intra-prediction mode for the current block, the set of available MTS schemes being one set of available MTS schemes of a plurality of sets of MTS schemes, each of the sets of MTS schemes of the plurality of sets of MTS schemes including a common number of MTS schemes, the common number being greater than one;

determine an MTS scheme from the set of available MTS schemes according to the determined mode group, wherein each of the MTS schemes of the plurality of sets of MTS schemes includes a respective transform pair including a respective horizontal transform and a respective vertical transform, wherein the current block has a size of W×H, wherein W is not equal to H;

apply transforms of the MTS scheme to a transform block of the current block to produce a residual block for the current block, wherein to apply the transforms, the processors are further configured to:

based on the transpose flag value being a first value:

apply the respective horizontal transform of the MTS scheme and the respective vertical transform of the MTS scheme to the transform block; or based on the transpose flag value being a second value, different than the first value:

transpose the respective horizontal transform of the MTS scheme to form a transposed vertical transform;

transpose the respective vertical transform of the MTS scheme to form a transposed horizontal transform; and apply the transposed horizontal transform and the transposed vertical transform to the transform block; and decode the current block using the residual block.

12. The device of claim 11, wherein the plurality of mode groups includes a first mode group including intra-prediction modes 0 and 1, a second group including intra-prediction modes 2 to 12, a third group including intra-prediction modes 13 to 23, a fourth group including intra-prediction modes 24 to 34, and a fifth group including matrix intra-prediction (MIP) mode.

13. The device of claim 11, wherein the size of the current block comprises a width of the current block and a height of the current block, and wherein the size of the current block is included in a size group.

14. The device of claim 11, wherein the one or more processors are further configured to decode an MTS index value representing the MTS scheme of the set of available MTS schemes, and wherein the one or more processors are configured to determine the MTS scheme using the MTS index value.

15. The device of claim 11, wherein the one or more processors are further configured to encode the current block prior to decoding the current block.

16. The device of claim 11, further comprising a display configured to display the decoded video data.

17. The device of claim 11, wherein the device comprises one or more of a camera, a computer, a mobile device, a broadcast receiver device, or a set-top box.

18. A non-transitory computer-readable medium having stored thereon instructions that when executed cause one or more processors to:

determine a size of a current block of video data;

determine an intra-prediction mode for the current block of video data wherein the determined intra-prediction mode comprises a matrix intra-prediction (MIP) mode having a transpose flag value;

determine a mode group including the determined intra-prediction mode, the mode group being one of a plurality of mode groups, each of the mode groups in the plurality of mode groups including respective sets of intra-prediction modes such that each possible intra-prediction mode is included in no more than one of the mode groups;

determine a set of available multiple transform selection (MTS) schemes for the current block according to the size and the intra-prediction mode for the current block, the set of available MTS schemes being one set of available MTS schemes of a plurality of sets of MTS schemes, each of the sets of MTS schemes of the plurality of sets of MTS schemes including a common number of MTS schemes, the common number being greater than one;

determine an MTS scheme from the set of available MTS schemes according to the determined mode group, wherein each of the MTS schemes of the plurality of sets of MTS schemes includes a respective transform pair including a respective horizontal transform and a respective vertical transform, wherein the current block has a size of W×H, wherein W is not equal to H;

apply transforms of the MTS scheme to a transform block of the current block to produce a residual block for the current block, wherein to apply the transforms, the instructions further cause the processors to:

based on the transpose flag value being a first value:

apply the respective horizontal transform of the MTS scheme and the respective vertical transform of the MTS scheme to the transform block; or based on the transpose flag value being a second value, different than the first value:

transpose the respective horizontal transform of the MTS scheme to form a transposed vertical transform;

transpose the respective vertical transform of the MTS scheme to form a transposed horizontal transform; and apply the transposed horizontal transform and the transposed vertical transform to the transform block; and decode the current block using the residual block.

* * * * *